(12) United States Patent
Narutani et al.

(10) Patent No.: US 10,061,281 B2
(45) Date of Patent: Aug. 28, 2018

(54) CONTROLLER SUPPORT DEVICE, METHOD, AND RECORDING MEDIUM

(75) Inventors: Fumiaki Narutani, Kyoto (JP); Taku Oya, Kyoto (JP); Yoshiya Shibata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 1014 days.

(21) Appl. No.: 14/005,317

(22) PCT Filed: Mar. 22, 2011

(86) PCT No.: PCT/JP2011/056774
§ 371 (c)(1),
(2), (4) Date: Dec. 3, 2013

(87) PCT Pub. No.: WO2012/124138
PCT Pub. Date: Sep. 20, 2012

(65) Prior Publication Data
US 2014/0088734 A1 Mar. 27, 2014

(30) Foreign Application Priority Data
Mar. 15, 2011 (JP) .................. 2011-056777

(51) Int. Cl.
G05B 19/04 (2006.01)
G05B 19/05 (2006.01)
G06F 11/34 (2006.01)
(52) U.S. Cl.
CPC ............ *G05B 19/04* (2013.01); *G05B 19/05* (2013.01); *G06F 11/3423* (2013.01);
(Continued)

(58) Field of Classification Search
CPC .................. G05B 19/04; G05B 19/05; G05B 2219/14042; G05B 2219/15126; G06F 11/3423; G06F 2201/865
See application file for complete search history.

(56) References Cited

U.S. PATENT DOCUMENTS

2002/0166112 A1 11/2002 Martin et al.
2005/0034128 A1* 2/2005 Nagashima ............ G05B 19/05
718/100
(Continued)

FOREIGN PATENT DOCUMENTS

EP 1391824 2/2004
JP 62-245443 10/1987
(Continued)

OTHER PUBLICATIONS

Machine translation of JP2007-156796, Shitamachi et al., Network Operation System, Jun. 21, 2007, 14 pages.*
(Continued)

*Primary Examiner* — Thomas C Lee
*Assistant Examiner* — Tri T Nguyen
(74) *Attorney, Agent, or Firm* — Greenblum & Bernstein, P.L.C.

(57) ABSTRACT

A controller support program causes an arithmetic unit to execute total execution time acquisition processing of acquiring a total execution time and output processing of outputting the total execution time. The total execution time is an elapsed time until execution of a control program is ended in an execution cycle since the execution cycle is started when a controller executes the control program according to an execution priority and the execution cycle, and the total execution time is also a time measured in the controller or a time estimated in a controller support device.

21 Claims, 12 Drawing Sheets

(52) U.S. Cl.
CPC .............. *G05B 2219/14042* (2013.01); *G05B 2219/15126* (2013.01); *G06F 2201/865* (2013.01)

(56) References Cited

U.S. PATENT DOCUMENTS

| | | | |
|---|---|---|---|
| 2005/0166027 A1* | 7/2005 | Uchiyama | G06F 12/0802 711/169 |
| 2006/0181953 A1* | 8/2006 | Rotenberg | G06F 13/4239 365/230.06 |
| 2009/0312856 A1 | 12/2009 | Jong et al. | |
| 2012/0239978 A1 | 9/2012 | Narutani et al. | |
| 2013/0144409 A1* | 6/2013 | Kushiro | G05B 19/0426 700/83 |

FOREIGN PATENT DOCUMENTS

| | | | |
|---|---|---|---|
| JP | 5-257830 | | 10/1993 |
| JP | 8-278804 | | 10/1996 |
| JP | 08278804 | A * | 10/1996 .......... G05B 19/048 |
| JP | 9-128243 | | 5/1997 |
| JP | 10-63603 | | 3/1998 |
| JP | 2001-209411 | | 8/2001 |
| JP | 2008-310748 | | 12/2008 |
| JP | 2009-076073 | | 4/2009 |
| WO | 01/35223 | | 5/2001 |
| WO | 2006/113111 | | 10/2006 |

OTHER PUBLICATIONS

Machine translation of JP2007-156796, Shitamachi Kenichi, Network Operation System, Jun. 21, 2007, 7 pages.*
International Search report for PCT/JP2011/056774, dated Jun. 14, 2011.
European Search Report in European Patent Application No. 11861252.2, dated Sep. 17, 2014.

* cited by examiner

CONTROLLER SUPPORT DEVICE, METHOD, AND RECORDING MEDIUM

TECHNICAL FIELD

The present invention relates to presentation of information on an execution time of a control program in a controller support device that supports use of a controller, such as a PLC (Programmable Logic Controller, also referred to as a Programmable controller), which is used to control operation of a machine or a facility.

BACKGROUND ART

The general-purpose PLC and the controller that individually controls a program dedicated to the machine and the like can be cited as an example of the controller that is used to control the operation of the machine or the facility.

For example, the PLC is constructed by a plurality of units, and the plurality of units include a CPU (Central Processing Unit) unit that includes a microprocessor executing a control program and an IO (Input Output) unit that inputs a signal from an external switch or sensor and outputs the signal to an external relay or actuator. The PLC executes control operation while data is exchanged between the units through a PLC system bus and/or a field network in each control program execution cycle.

The controller support device is used to generate various pieces of setting information on the controller and the control program executed by the controller, and to transfer the various pieces of setting information to the controller. For example, the controller support device is constructed by installing a controller support program on a general-purpose computer. For example, the controller support device includes an editor function of generating a source list of the control program, a compiler function of generating an object program operating in the controller from the source list of the control program, a controller simulator function of performing a test of the control program in the controller support device, and a communication function with the controller.

In a control program development stage, it is necessary to know an execution time necessary for the controller to execute the control program. The control program execution time is referred to when duration of the control program execution cycle is determined.

Japanese Unexamined Patent Publication No. 2001-209411 (Patent Document 1) discloses a method for obtaining the execution time in the PLC support device when the control program is executed by the PLC. Specifically, actual processing time data of each command used in the control program is prepared in the PLC, the actual processing time data is referred to every time each command is processed during program simulated execution processing of a simulator, and the actual processing time corresponding to the command is integrated. Patent Document 1 also discloses a method for obtaining an execution required time in each task when the whole control program is constructed by a plurality of divided tasks.

PRIOR ART DOCUMENT

Patent Document

Patent Document 1: Japanese Unexamined Patent Publication No. 2001-209411

SUMMARY OF THE INVENTION

Problems to be Solved by the Invention

In Patent Document 1, it is assumed that the whole control program is constructed by the plurality of divided tasks. Even in this case, because all the tasks are sequentially executed, the execution cycle is common to all the tasks. Accordingly, an integrated value of the actual processing time is determined by obtaining a sum of the times necessary for all the tasks.

In an execution form of the plurality of control programs in the controller, there is a form in which the plurality of control programs are executed while a different execution priority and different execution cycle duration are set to each of the plurality of control programs. The execution cycle is set to an integral multiple of the control cycle that is of a basic unit of an operating time of the controller. The plurality of control programs are executed according to the execution priority and the execution cycle in each control cycle. That is, each control program enters an execution waiting state when the new execution cycle of itself is started. In one control cycle, the control program having the higher execution priority is executed first, and the control program having the lower execution priority is executed when the execution of the control program having the higher execution priority is ended. When the control cycle is ended while the control program is still executed, the execution of the control program is interrupted, and the control program having the higher execution priority is executed first in the next control cycle again. After the execution of the control program having the higher execution priority and in a state where the control program can be executed, the control program having been interrupted in the preceding control cycle is resumed to be executed from an unexecuted portion.

That is, sometimes the control program having the lower execution priority is intermittently executed with an execution interruption interval. In such cases, even if the integrated value of the actual processing time is simply presented for the control program having the lower execution priority, it cannot be known how long execution cycle duration is necessary to execute the control program.

An object of the present invention is to output information on the execution time that can be compared to the execution cycle duration with respect to the control program having the lower execution priority in the controller support device that supports the use of the controller, when the controller executes the plurality of control programs according to the execution priority and the execution cycle.

Means for Solving the Problem

In accordance with one aspect of the present invention, a controller support device configured to support use of a controller controlling a control target is provided. The controller can execute a plurality of control programs in each control cycle according to an execution priority set on each of the control programs and an execution cycle that is an integral multiple of the control cycle. The controller support device includes a storage unit and an arithmetic unit.

The storage unit is used to store a controller support program and the control program therein. The controller support program causes the arithmetic unit to execute total execution time acquisition processing of acquiring a total execution time and output processing of outputting the total execution time, the total execution time being an elapsed time until execution of the control program is ended in the execution cycle from when the execution cycle is started when the controller executes the control program according to the execution priority and the execution cycle, the total execution time being a time measured in the controller or a time estimated in the controller support device.

Preferably, the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device. The total execution time acquisition processing includes processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the controller executes input-output processing in each of the control cycle or the execution cycle of the control program. The controller support program causes the arithmetic unit to execute input-output time acquisition processing of acquiring an input-output time, the input-output time being a time necessary for the controller to execute the input-output processing, the input-output time being the time measured in the controller or the time estimated in the controller support device. The total execution time acquisition processing includes processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the output processing is processing of outputting display data that is used to display the total execution time in a form of a graph, in which the total execution time can be contrasted with duration of the execution cycle of the target control program that is of the target from which the total execution time is acquired.

Preferably, the output processing is processing of outputting display data used to display the total execution time and the net execution time included in the total execution time.

In accordance with another aspect of the present invention, a controller support program that is executed in a controller support device configured to support use of a controller controlling a control target is provided. The controller can execute a plurality of control programs in each control cycle according to an execution priority set on each of the control programs and an execution cycle that is an integral multiple of the control cycle. The controller support device includes a storage unit and an arithmetic unit. The storage unit is used to store the controller support program and the control program therein. The controller support program causes the arithmetic unit to execute total execution time acquisition processing of acquiring a total execution time and output processing of outputting the total execution time, the total execution time being an elapsed time until execution of the control program is ended in the execution cycle from when the execution cycle is started when the controller executes the control program according to the execution priority and the execution cycle, the total execution time being a time measured in the controller or a time estimated in the controller support device.

Preferably, the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device. The total execution time acquisition processing includes processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the controller executes input-output processing in each of the control cycle or the execution cycle of the control program. The controller support program causes the arithmetic unit to execute input-output time acquisition processing of acquiring an input-output time, the input-output time being a time necessary for the controller to execute the input-output processing, the input-output time being the time measured in the controller or the time estimated in the controller support device. The total execution time acquisition processing includes processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the output processing is processing of outputting display data that is used to display the total execution time in a form of a graph, in which the total execution time can be contrasted with duration of the execution cycle of the target control program that is of the target from which the total execution time is acquired.

Preferably, the output processing is processing of outputting display data used to display the total execution time and the net execution time included in the total execution time.

In accordance with still another aspect of the present invention, a recording medium in which a controller support program is stored is provided, the controller support program being executed in a controller support device configured to support use of a controller controlling a control target. The controller can execute a plurality of control programs in each control cycle according to an execution priority set on each of the control programs and an execution cycle that is an integral multiple of the control cycle. The controller support device includes a storage unit and an arithmetic unit. The storage unit is used to store the controller support program and the control program therein. The controller support program causes the arithmetic unit to execute total execution time acquisition processing of acquiring a total execution time and output processing of outputting the total execution time, the total execution time being an elapsed time until execution of the control program is ended in the execution cycle from when the execution cycle is started when the controller executes the control program according to the execution priority and the execution cycle, the total execution time being a time measured in the controller or a time estimated in the controller support device.

Preferably, the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device. The total execution time acquisition processing includes processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the controller executes input-output processing in each of the control cycle or the execution cycle of the control program. The controller support program causes the arithmetic unit to execute input-output time acquisition processing of acquiring an input-output time, the input-output time being a time necessary for the controller to execute the input-output processing, the input-output time being the time measured in the controller or the time estimated in the controller support device. The total execution time acquisition processing includes processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

Preferably, the net execution time acquisition processing is processing of acquiring an estimated execution time as the net execution time, the estimated execution time being calculated from an execution time of the control program, the execution time of the control program being measured in a simulator of the controller.

Preferably, the output processing is processing of outputting display data that is used to display the total execution time in a form of a graph, in which the total execution time can be contrasted with duration of the execution cycle of the target control program that is of the target from which the total execution time is acquired.

Preferably, the output processing is processing of outputting display data used to display the total execution time and the net execution time included in the total execution time.

Effect of the Invention

In accordance with the present invention, in the controller support device that supports the use of the controller, the information on the execution time that can be compared to the execution cycle duration can be output with respect to the control program having the lower execution priority, when the controller executes the plurality of control programs according to the execution priority and the execution cycle.

MODE FOR CARRYING OUT THE INVENTION

Figure 1:
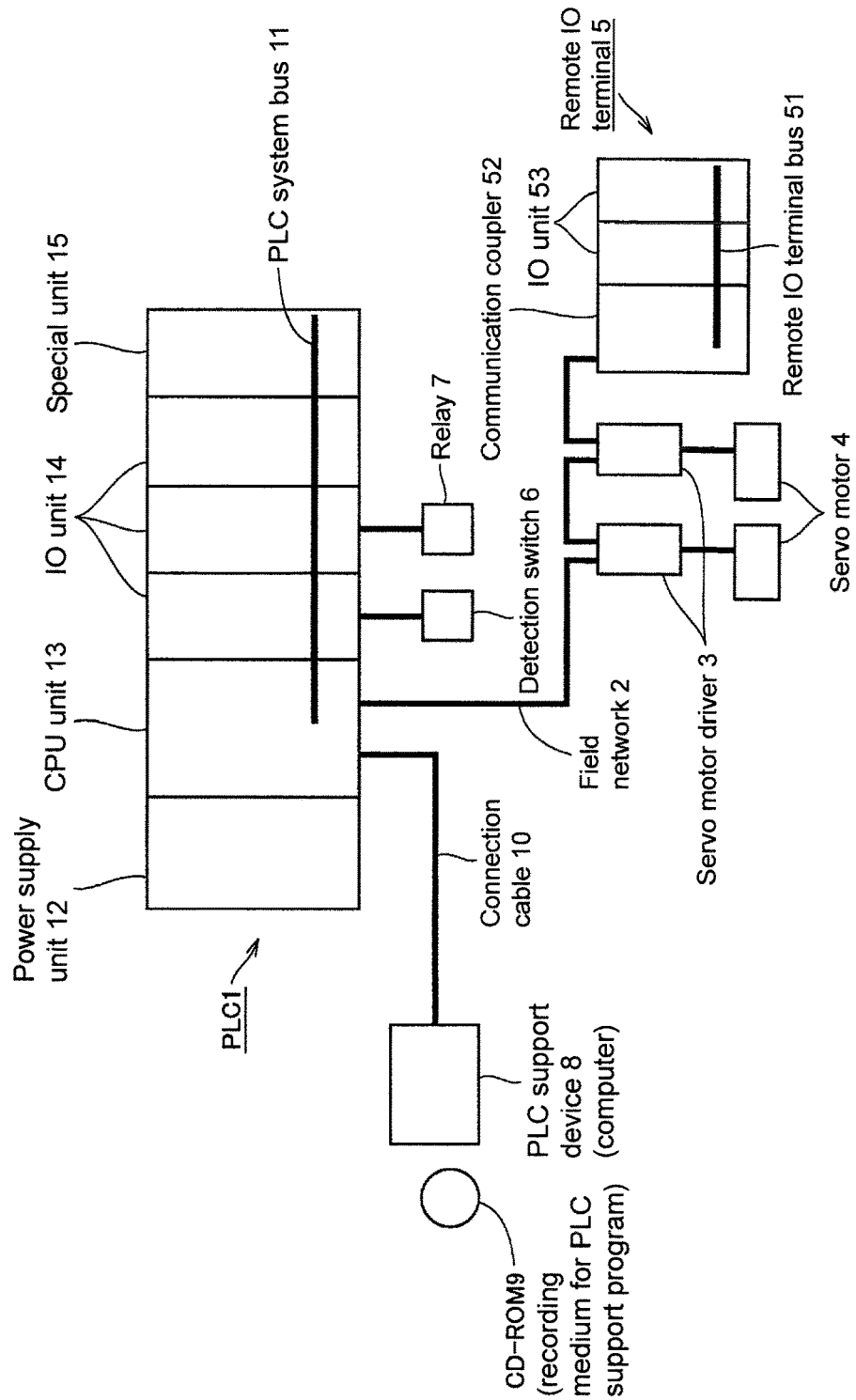
FIG. 1 is a schematic diagram illustrating an outline configuration of a PLC system of which use is supported by a controller (PLC) support device according to an embodiment of the present invention.

An embodiment of the present invention will be described with reference to the drawings. The identical or equivalent component in the drawings is designated by the identical numeral, and the overlapping description is neglected.

A. System Configuration

A PLC is described as a typical example of a controller of which use is supported by a controller support device according to an embodiment. The PLC controls a control target such as a machine and a facility. The PLC includes a CPU unit as a constructional element. The CPU unit includes a microprocessor, a storage unit, and a communication circuit. The storage unit is used to store a control program, a system program controlling execution of a program, and the like. The microprocessor executes the system program and the control program, which are stored in the storage unit. The communication circuit transmits output data and receives input data.

A system configuration of a PLC 1 will be described with reference to FIG. 1. FIG. 1 is a schematic diagram illustrating an outline configuration of a PLC system of which the use is supported by the controller (PLC) support device of the embodiment.

Referring to FIG. 1, a PLC system SYS includes the PLC 1, a servo motor driver 3 and a remote IO terminal 5, which are connected to the PLC 1 through a field network 2, and a detection switch 6 and a relay 7, which are of a field device. A controller support device 8 is connected to the PLC 1 through a connection cable 10 and the like.

The PLC 1 includes a CPU unit 13 that executes main arithmetic processing, at least one IO unit 14, and a special unit 15. These units are configured to be able to exchange data among the units through a PLC system bus 11. A power supply unit 12 supplies a power having a proper voltage to each unit. Because each unit constituting the PLC 1 is provided by a PLC manufacturer, generally the PLC system bus 11 is uniquely developed and used in each PLC manufacturer. On the other hand, in many cases a standard of the field network 2 is disclosed such that products of different manufacturers can be connected to each other.

Figure 2:
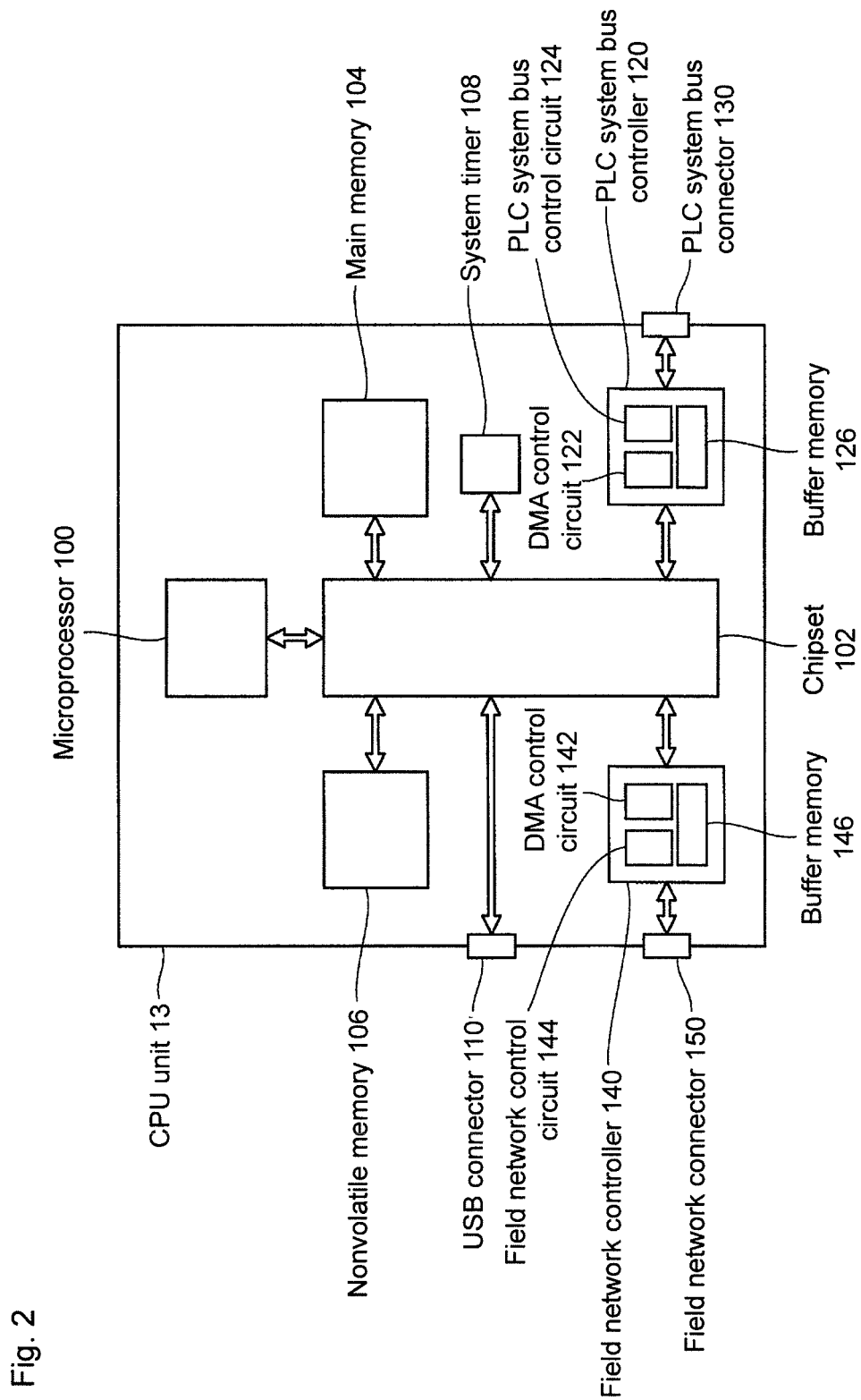
FIG. 2 is a schematic diagram illustrating a hardware configuration of a CPU unit of which use is supported by the controller (PLC) support device of the embodiment of the present invention.

The detailed CPU unit 13 is described later with reference to FIG. 2.

The IO unit 14 is a general unit related to input-output processing, and controls input and output of binary data such as on/off. That is, the IO unit 14 collects information on whether the sensor such as the detection switch 6 is in a state in which the detection switch 6 detects some sort of target (on) or a state in which the detection switch 6 does not detect any target (off). The IO unit 14 outputs an activation command (on) or a deactivation command (off) to an output destination such as the relay 7 or the actuator.

The special unit 15 includes functions, such as input and output of analog data, temperature control, and communication pursuant to a specific communication system, which are not supported by the IO unit 14.

The field network 2 transmits various kinds of data to and from the CPU unit 13. Typically various kinds of industrial Ethernet (registered trademark) can be used as the field network 2. Examples of the industrial Ethernet (registered trademark) include EtherCAT (registered trademark), Profinet IRT, MECHATROLINK (registered trademark)-III, Powerlink, SERCOS (registered trademark)-III, and CIP Motion. Any industrial Ethernet (registered trademark) may be used as the field network 2. A field network except the industrial Ethernet (registered trademark) may be used. For example, DeviceNet and CompoNet/IP (registered trademark) may be used in the case motion control is not performed.

FIG. 1 illustrates the PLC system SYS including both the PLC system bus 11 and the field network 2. Alternatively, a system configuration including only one of the PLC system bus 11 and the field network 2 may be used. For example, all the units may be connected to one another through the field network 2. Alternatively, the servo motor driver 3 may directly be connected to the PLC system bus 11 with no use of the field network 2. A communication unit of the field network 2 may be connected to the PLC system bus 11, and the CPU unit 13 may conduct communication with a device connected to the field network 2 through the communication unit.

In the PLC 1, when CPU unit 13 possesses the function of the IO unit 14 or the function of the servo motor driver 3, the CPU unit 13 may directly control the control target without the IO unit 14 or the servo motor driver 3.

The servo motor driver 3 drives a servo motor 4 in response to a command value from the CPU unit 13 while being connected to the CPU unit 13 through the field network 2. More specifically, the servo motor driver 3 receives command values such as a position command value, a speed command value, and a torque command value from the PLC 1 at constant intervals. The servo motor driver 3 acquires a measured value, such as a position, a speed (typically calculated from the difference between a current position and a preceding position), and a torque, which is related to operation of the servo motor 4 from a detector, such as a position sensor (rotary encoder) and a torque sensor, which is connected to a shaft of the servo motor 4. The servo motor driver 3 sets the command value from the CPU unit 13 to a target value, and performs feedback control with the measured value as a feedback value. That is, the servo motor driver 3 adjusts a current driving the servo motor 4 such that the measured value comes close to the target value. The servo motor driver 3 is also called a servo motor amplifier.

FIG. 1 illustrates a system example in which the servo motor 4 and the servo motor driver 3 are combined. Alternatively, a system in which a pulse motor and a pulse motor driver are combined may be used.

The remote IO terminal 5 is also connected to the field network 2 of the PLC system SYS in FIG. 1. Basically, similarly to the IO unit 14, the remote IO terminal 5 performs processing related to the general input-output processing. More specifically, the remote IO terminal 5 includes a communication coupler 52 that performs processing related to data transmission through the field network 2 and at least one IO unit 53. These units are configured such that the data can be exchanged between the units through the remote IO terminal bus 51.

The controller support device 8 of the embodiment of the present invention is described later.

<B. Hardware Configuration of CPU Unit>

A hardware configuration of the CPU unit 13 will be described below with reference to FIG. 2. FIG. 2 is a schematic diagram illustrating the hardware configuration of the CPU unit 13 of which the use is supported by the controller (PLC) support device of the embodiment of the present invention. Referring to FIG. 2, the CPU unit 13 includes a microprocessor 100, a chipset 102, a main memory 104, a nonvolatile memory 106, a system timer 108, a PLC system bus controller 120, a field network controller 140, a field network connector 150, and a USB connector 110. The chipset 102 and other components are coupled to each other through various buses.

Typically the microprocessor 100 and the chipset 102 are constructed pursuant to a general-purpose computer architecture. That is, the microprocessor 100 interprets and executes a command code that is sequentially supplied from the chipset 102 according to an internal clock. The chipset 102 generates the command code necessary for the microprocessor 100 while internally exchanging the data with connected various components. The chipset 102 also includes the function of caching the data obtained as a result of arithmetic processing executed by the microprocessor 100.

The CPU unit 13 includes the main memory 104 and the nonvolatile memory 106 as the storage unit.

The main memory 104 is a volatile storage area (RAM), and retains various programs that should be executed by the microprocessor 100 after the CPU unit 13 is powered on. The main memory 104 is also used as a working memory while the microprocessor 100 executes the various programs. Devices such as a DRAM (Dynamic Random Access Memory) and an SRAM (Static Random Access Memory) are used as the main memory 104.

On the other hand, the nonvolatile memory 106 retains a real-time OS (Operating System), a system program of the PLC1, a user program, and a motion arithmetic program, and pieces of data such as a system setting parameter in a nonvolatile manner. The programs and the pieces of data are copied in the main memory 104 so as to be able to be accessed by the microprocessor 100 as needed basis. Semiconductor memories such as a flash memory can be used as the nonvolatile memory 106. Alternatively, optical recording mediums such as a magnetic recording medium such as a hard disk drive and a DVD-RAM (Digital Versatile Disk Random Access Memory) may be used.

The system timer 108 generates an interrupt signal at constant intervals, and provides the interrupt signal to the microprocessor 100. Typically the system timer 108 is configured so as to generate the interrupt signal in each of a plurality of different intervals according to a hardware specification. Alternatively, the system timer 108 may generate the interrupt signal at any interval according to the OS (Operating System) or a BIOS (Basic Input/Output System). As described later, control operation is performed in each control cycle using the interrupt signal generated by the system timer 108.

The CPU unit 13 includes the PLC system bus controller 120 and the field network controller 140 as the communication circuit. These communication circuits transmit the output data and receive the input data.

In the case that the CPU unit 13 includes the function of the IO unit 14 or servo motor driver 3 in itself, the transmission of the output data and the reception of the input data by the communication circuit are performed in the CPU unit 13 with a portion taking a role of the function as the other party of communication.

The PLC system bus controller 120 controls the data exchange through the PLC system bus 11. More specifically, the PLC system bus controller 120 includes a DMA (Dynamic Memory Access) control circuit 122, a PLC system bus control circuit 124, and a buffer memory 126. The PLC system bus controller 120 is internally connected to the PLC system bus 11 through a PLC system bus connector 130.

The buffer memory 126 acts as a transmission buffer for data (hereinafter also referred to as "output data") that is output to another unit through the PLC system bus 11 and a reception buffer for data (hereinafter also referred to as "input data") that is input from another unit through the PLC system bus 11. The output data generated through the arithmetic processing by the microprocessor 100 is initially stored in the main memory 104. The output data that should be transferred to a specific unit is read from the main memory 104, and primarily retained in the buffer memory 126. The input data transferred from another unit is moved to the main memory 104 after primarily retained in the buffer memory 126.

The DMA control circuit 122 transfers the output data from the main memory 104 to the buffer memory 126, and transfers the input data from the buffer memory 126 to the main memory 104.

The PLC system bus control circuit 124 performs processing of transmitting the output data of the buffer memory 126 and processing of receiving the input data to store the input data in the buffer memory 126, to and from another unit connected to the PLC system bus 11. Typically the PLC system bus control circuit 124 provides the functions of a physical layer and a data link layer in the PLC system bus 11.

The field network controller 140 controls the data exchange through the field network 2. That is, the field network controller 140 controls the transmission of the output data and the reception of the input data pursuant to the standard of the field network 2 used. For example, the field network controller 140 including hardware conducting usual Ethernet (registered trademark) communication is used in the case of the field network 2 pursuant to an EtherCAT (registered trademark) standard. The general Ethernet (registered trademark) that implements a communication protocol pursuant to the usual Ethernet (registered trademark) standard can be used in the EtherCAT (registered trademark) standard. An Ethernet (registered trademark) controller having a special specification pursuant to a dedicated communication protocol different from the usual communication protocol is used depending on a kind of the industrial Ethernet (registered trademark) used as the field network 2. In the case that the field network except the industrial Ethernet (registered trademark) is used, the field network controller dedicated to the standard of the field network except the industrial Ethernet (registered trademark) is used.

A buffer memory 146 acts as the transmission buffer for data (the data is also referred to as "output data") that is output to another unit through the field network 2 and the reception buffer for data (the data is also referred to as "input data") that is input from another unit through the field network 2. As described above, the output data generated through the arithmetic processing by the microprocessor 100 is initially stored in the main memory 104. The output data that should be transferred to a specific device is read from the main memory 104, and primarily retained in the buffer memory 146. The input data transferred from another device is moved to the main memory 104 after primarily retained in the buffer memory 146.

A DMA control circuit 142 transfers the output data from the main memory 104 to the buffer memory 146, and transfers the input data from the buffer memory 146 to the main memory 104.

A field network control circuit 144 performs the processing of transmitting the output data of the buffer memory 146 and the processing of receiving the input data to store the input data in the buffer memory 146, to and from another unit connected to the field network 2. Typically the field network control circuit 144 provides the functions of the physical layer and the data link layer in the field network 2.

The USB connector 110 is an interface that connects the controller support device 8 and the CPU unit 13. Typically the program, which is transferred from the controller support device 8 and can be executed by the microprocessor 100 of the CPU unit 13, is captured in the PLC 1 through the USB connector 110.

C. Software Configuration of CPU Unit

A software group with which the controller (PLC1) provides various functions will be described below with reference to FIG. 3. The command code included in the software group is read in proper timing and executed by the microprocessor 100 of the CPU unit 13.

Figure 3:
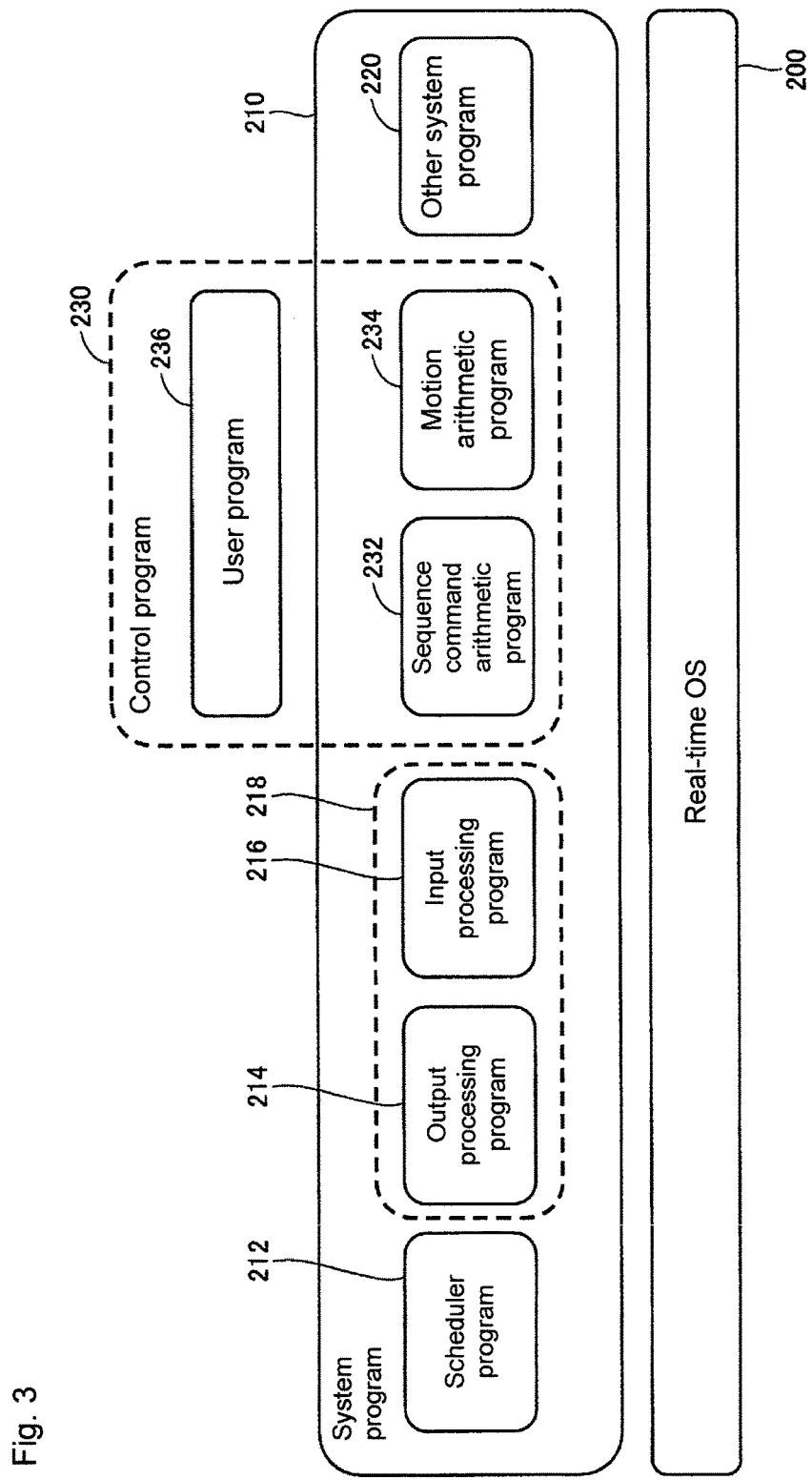
FIG. 3 is a schematic diagram illustrating a software configuration executed by the CPU unit of which the use is supported by the controller (PLC) support device of the embodiment of the present invention.

FIG. 3 is a schematic diagram illustrating a software configuration executed by the CPU unit 13 of which the use is supported by the controller (PLC) support device of the embodiment of the present invention. Referring to FIG. 3, the software executed by the CPU unit 13 has three hierarchies, namely, a real-time OS 200, a system program 210, and a user program 236.

The real-time OS 200 is designed according to the computer architecture of the CPU unit 13, and provides a basic execution environment in order that the microprocessor 100 executes the system program 210 and the user program 236. The real-time OS 200 is typically provided by a PLC manufacturer or a specialized software firm.

The system program 210 is the software group that provides the functions of the PLC 1. Specifically, the system program 210 includes a scheduler program 212, an output processing program 214, an input processing program 216, a sequence command arithmetic program 232, a motion arithmetic program 234, and other system program 220. Because the output processing program 214 and the input processing program 216 are continuously (integrally) executed, sometimes the output processing program 214 and the input processing program 216 are collectively called an IO processing program 218.

The user program 236 is generated according to a control purpose of a user. That is, the user program 236 is a program that is arbitrarily designed according to a line (process) of a target controlled using the PLC system SYS.

The user program 236 achieves the control purpose of the user in conjunction with the sequence command arithmetic program 232 and the motion arithmetic program 234. That is, the user program 236 performs the programmed operation using a command, a function, a functional module, which are provided by the sequence command arithmetic program 232 and the motion arithmetic program 234. Therefore, the user program 236, the sequence command arithmetic program 232, and the motion arithmetic program 234 are sometimes collectively called a control program 230.

Each program will be described in detail below.

As described above, the user program 236 is generated according to the control purpose (for example, the target line or process) of the user. Typically the user program 236 has an object program form that can be executed by the microprocessor 100 of the CPU unit 13. The user program 236 is generated in the controller support device 8 by compiling a source program described in ladder language. The generated user program 236 having the object program form is transferred from the controller support device 8 to the CPU unit 13 through the connection cable 10, and stored in the nonvolatile memory 106.

The scheduler program 212 controls starting of the processing in each execution cycle and resumption of the processing after the interruption of the processing with respect to the output processing program 214, the input processing program 216, and the control program 230. More specifically, the scheduler program 212 controls the execution of the user program 236 and the motion arithmetic program 234.

In the CPU unit 13, the execution cycle (control cycle) having constant duration suitable for the motion arithmetic program 234 is used as a common cycle of the whole processing. Because all the pieces of processing are hardly completed in one control cycle, the processing in which the execution should be completed in each control cycle and the processing that may be executed across a plurality of control cycles are classified according to a priority of the processing to be executed. The scheduler program 212 manages an execution sequence of the classified processing. More specifically, the scheduler program 212 executes the program having the higher priority first in each control cycle.

The output processing program 214 relocates the output data generated by the execution of the user program 236 (control program 230) into the form that is suitable to transfer the output data to the PLC system bus controller 120 and/or the field network controller 140. In the case that the PLC system bus controller 120 or the field network controller 140 needs to receive an instruction to perform the transmission from the microprocessor 100, the output processing program 214 issues the instruction.

The input processing program 216 relocates the input data received by the PLC system bus controller 120 and/or the field network controller 140 into the form that is suitably used by the control program 230.

The sequence command arithmetic program 232 is called when some sort of sequence command used in the user program 236 is executed, and the sequence command arithmetic program 232 is executed in order to perform a content of the sequence command.

The motion arithmetic program 234 is executed in response to the instruction of the user program 236, and calculates every time the command value output to the motor driver such as the servo motor driver 3 and the pulse motor driver.

The other system program 220 collectively illustrates a program group, which implements various functions of the PLC 1, other than the programs individually illustrated in FIG. 3.

The real-time OS 200 provides an environment in which the plurality of programs are executed while switched according to an elapsed time. In the PLC 1, an interrupt of control cycle starting is initially set as an event (interrupt) that outputs (transmits) the output data generated through the program executed by the CPU unit 13 to another unit or another device. When the interrupt of the control cycle starting is generated, the real-time OS 200 switches the execution target in the microprocessor 100 from the program executed at a time point of the generation of the interrupt to the scheduler program 212. In the case that the scheduler program 212 and the program in which the execution is controlled by the scheduler program 212 are not executed, the real-time OS 200 executes the program included in the other system program 220. A program related to communication processing between the CPU unit 13 and the controller support device 8 through the connection cable 10 (USB) can be cited as an example of the program included in the other system program 220.

The control program 230 and the scheduler program 212 are stored in the main memory 104 and the nonvolatile memory 106, which are of the storage unit.

D. Execution Operation in CPU Unit

Then execution operation in the CPU unit 13 will be described.

Figure 4:
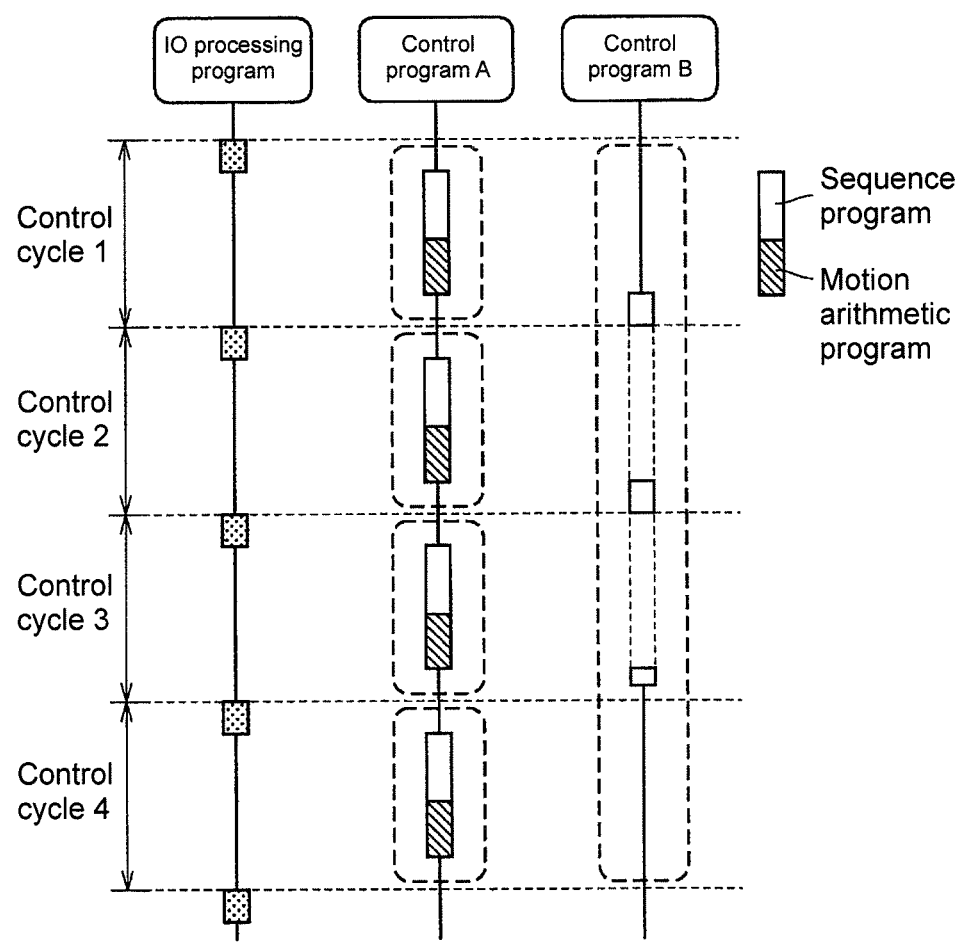
FIG. 4 is a sequence diagram illustrating an example of execution operation of the CPU unit of which the use is supported by the controller (PLC) support device of the embodiment of the present invention.

FIG. 4 is a sequence diagram illustrating an example of the execution operation of the CPU unit 13 of which the use is supported by the controller (PLC) support device of the embodiment of the present invention. In FIG. 4, the duration in which each of an IO processing program, a control program A, and a control program B is executed is illustrated along a time axis elapsing from an upper portion of a paper plain toward a lower portion.

A broken-line rectangle with round corners along the time axis of each of the control programs A and B illustrates the execution cycle of the corresponding control program. In the example in FIG. 4, the one-time control cycle is used as the execution cycle in the control program A, and the four-time control cycle is used as the execution cycle in the control program B. It is assumed that an execution priority of the control program A is higher than that of the control program B.

The sequence program (user program) of the control program A includes a motion command to perform motion control, and the motion arithmetic program 234 is called and executed by performing the motion command. On the other hand, the sequence program of the control program B does not include the motion command.

When a control cycle 1 is started, the IO processing program is executed under the execution control of the scheduler program 212.

When the IO processing program is executed to end the output processing and the input processing, the control program A is executed under the execution control of the scheduler program 212. During the execution of the control program A, the sequence program is executed first, and the motion arithmetic program 234 is executed. The sequence command arithmetic program 232 is executed during the execution of the sequence program every time the sequence command arithmetic program 232 is called. The whole (the sequence program and the motion arithmetic program) of the control program A is constructed as one thread, and continuously executed irrespective of the scheduler program 212.

After the control program A is executed, the control program B is executed under the execution control of the scheduler program 212. However, because the control cycle 1 is ended (a control cycle 2 is started) while the control program B is executed, the execution of the control program B is interrupted at that point.

After the control cycle 2 as well, the IO processing program and the control program A are repeatedly executed similarly to the control cycle 1. The unexecuted portion of the control program B is executed when the execution of the control program A is ended in the control cycle 2. However, because the control cycle 2 is ended while the control program B is executed, the execution of the control program B is interrupted again.

The execution of the control program B in which the execution is resumed in a control cycle 3 is ended before the control cycle 3 is ended.

Although the execution cycle of the control program B started from the control cycle 1 is continued in a control cycle 4, the execution of the control program B is not executed in the control cycle 4 because the execution of the current execution cycle of the control program B is already ended in the control cycle 3.

Thus, in the PLC1, the plurality of control programs can be executed in each control cycle according to the execution priority set on each control program and the execution cycle that is the integral multiple of the control cycle. The PLC 1 executes the input-output processing (IO processing) in each control cycle or each execution cycle of the control program.

E. Hardware Configuration of Support Device

The controller support device 8 that generates the programs executed by the PLC 1 and performs maintenance of the PLC 1 will be described below.

Figure 5:
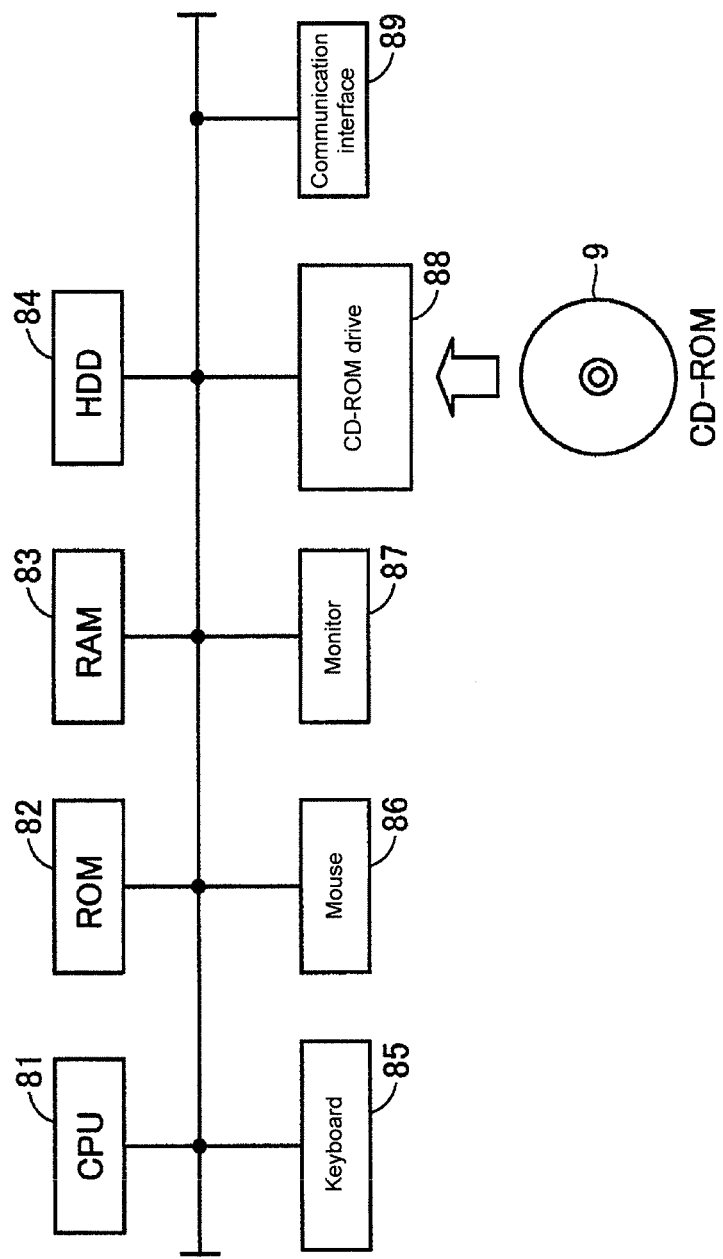
FIG. 5 is a schematic diagram illustrating a hardware configuration of the controller support device of the embodiment of the present invention.

FIG. 5 is a schematic diagram illustrating the hardware configuration of the controller support device 8 of the embodiment of the present invention. Referring to FIG. 5, the controller support device 8 is typically constructed by the general-purpose computer. Preferably the controller support device 8 is constructed by a notebook personal computer having excellent portability from the viewpoint of maintenance.

Referring to FIG. 5, the controller support device 8 includes a CPU 81 that executes various programs including the OS, a ROM (Read Only Memory) 82 in which the BIOS and various kinds of data are stored, a memory RAM 83 that provides the working area in order to store the data necessary to execute the program in the CPU 81, and a hard disk (HDD) 84 in which the programs executed by the CPU 81 are stored in the nonvolatile manner. The CPU 81 corresponds to the arithmetic unit of the controller support device 8, and the ROM 82, the RAM 83, and the hard disk 84 correspond to the storage unit of the controller support device 8.

The controller support device 8 also includes a keyboard 85 and a mouse 86, which receive an operation from the user, and a monitor 87 that presents information to the user. The controller support device 8 also includes a communication interface (IF) 89 that is used to conduct communication with the PLC 1 (CPU unit 13).

As described later, various programs executed by the controller support device 8 are distributed while stored in a CD-ROM 9. The programs stored in the CD-ROM 9 are read by a CD-ROM (Compact Disk-Read Only Memory) drive 88, and stored in the hard disk (HDD) 84. Alternatively, the programs may be downloaded from a high-order host computer through a network.

As described above, because controller support device 8 is constructed using the general-purpose computer, the detailed description is not made any more.

F. Software Configuration of Controller Support Device

A software group with which the controller support device 8 of the embodiment provides various functions will be described below with reference to FIG. 6.

Figure 6:
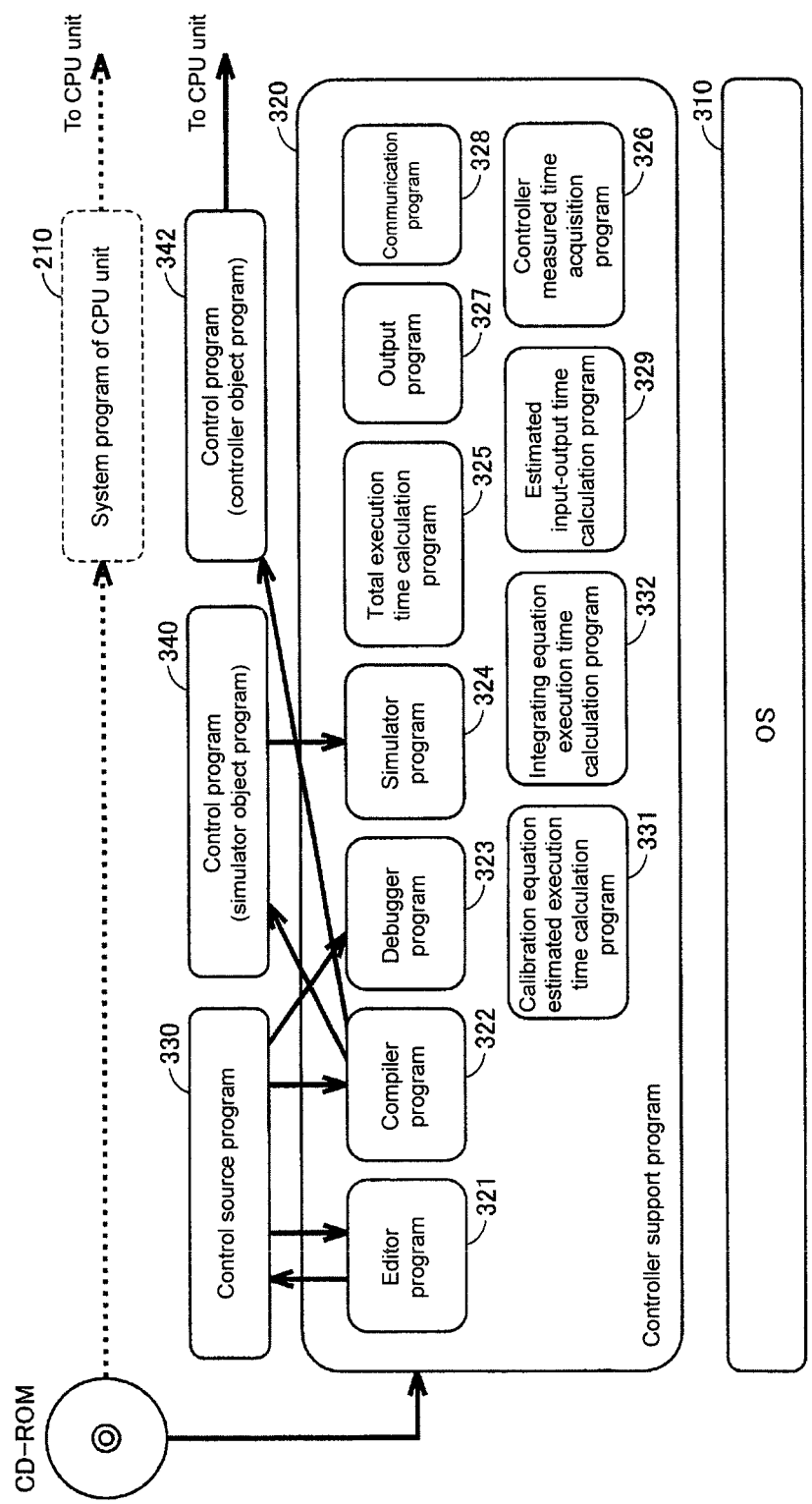
FIG. 6 is a schematic diagram illustrating a software configuration of the controller support device of the embodiment of the present invention.

FIG. 6 is a schematic diagram illustrating the software configuration of the controller support device 8 of the embodiment of the present invention. Referring to FIG. 6, in the controller support device 8, an OS 310 is executed to provide an environment in which various programs included in a controller support program 320 can be executed.

The controller support program 320 includes an editor program 321, a compiler program 322, a debugger program 323, a simulator program 324, a total execution time calculation program 325, an output program 327, a communication program 328, a calibration equation estimated execution time calculation program 331, an integrating equation execution time calculation program 332, an estimated input-output time calculation program 329, and a controller measured time acquisition program 326. Typically, the programs included in the controller support program 320 are distributed while stored in the CD-ROM 9, and the programs are installed on the controller support device 8.

The editor program 321 provides the input and edit functions in order to generate a user program (source program) 330. More specifically, in addition to the function in which the user operates the keyboard 85 or the mouse 86 to generate the control source program 330 of the user program 236, the editor program 321 provides the function of storing and editing the generated control source program 330. The editor program 321 inputs the source program of the control program 230 (particularly, the user program 236) from the outside, and edits the source program of existing control program 230 by the user's operation.

The compiler program 322 provides the function of compiling the control source program 330 to generate a control program 342 having an object program form that can be executed by the microprocessor 100 of the CPU unit 13. The compiler program 322 provides the function of compiling the control source program 330 to generate a control program 340 having an object program form that can be executed by the CPU 81 of the controller support device 8.

The debugger program 323 provides the function of debugging the control source program 330. The debug includes operation to partially execute a range assigned by the user in the control source program 330 and operation to track a temporal change of a variable during the execution of the control source program 330.

When the simulator program 324 is executed, the simulator program 324 constructs a simulator of the CPU unit 13 (controller) of the PLC 1 in the controller support device 8. The simulator provides the following functions.

(1) The function of the real-time OS of the CPU unit 13, in which the control cycle is started using a signal of a system timer (2) The function of the scheduler program 212 of the CPU unit 13, in which the execution of the control program 230 is controlled according to the execution priority and the execution cycle of the control program (3) The functions of the output processing program 214 and the input processing program 216 of the CPU unit 13

(4) The function of providing the input data instead of the control target and, if possible, the function of emulating the control target, which operates by receiving the output data, and reflecting an operation result on the input data The simulator program 324 provides the program corresponding to the sequence command arithmetic program 232 and/or the motion arithmetic program 234 in the CPU unit 13, the program necessary for the control program (simulator object program) 340 to operate on the simulator.

An execution code of the control program (simulator object program) 340 is the code that can be executed by the CPU 81 of the controller support device 8, the control program (simulator object program) 340 is directly executed by the controller support device 8 under the execution control or support of the execution environment.

Alternatively, the simulator program 324 may virtually construct the microprocessor 100 of the CPU unit 13 to operate the control program (controller object program) 342 on the simulator. In this case, because the control program (simulator object program) 340 and the control program (controller object program) 342 become the identical program, it is not necessary to individually generate the control program (simulator object program) 340 and the control program (controller object program) 342.

In the case that the CPU 81 can execute the execution code of the control program (controller object program) 342 while the CPU 81 of the controller support device 8 and the microprocessor 100 of the CPU unit 13 are the identical processor line, the control program (simulator object program) 340 and the control program (controller object program) 342 become the identical program.

Figure 7:
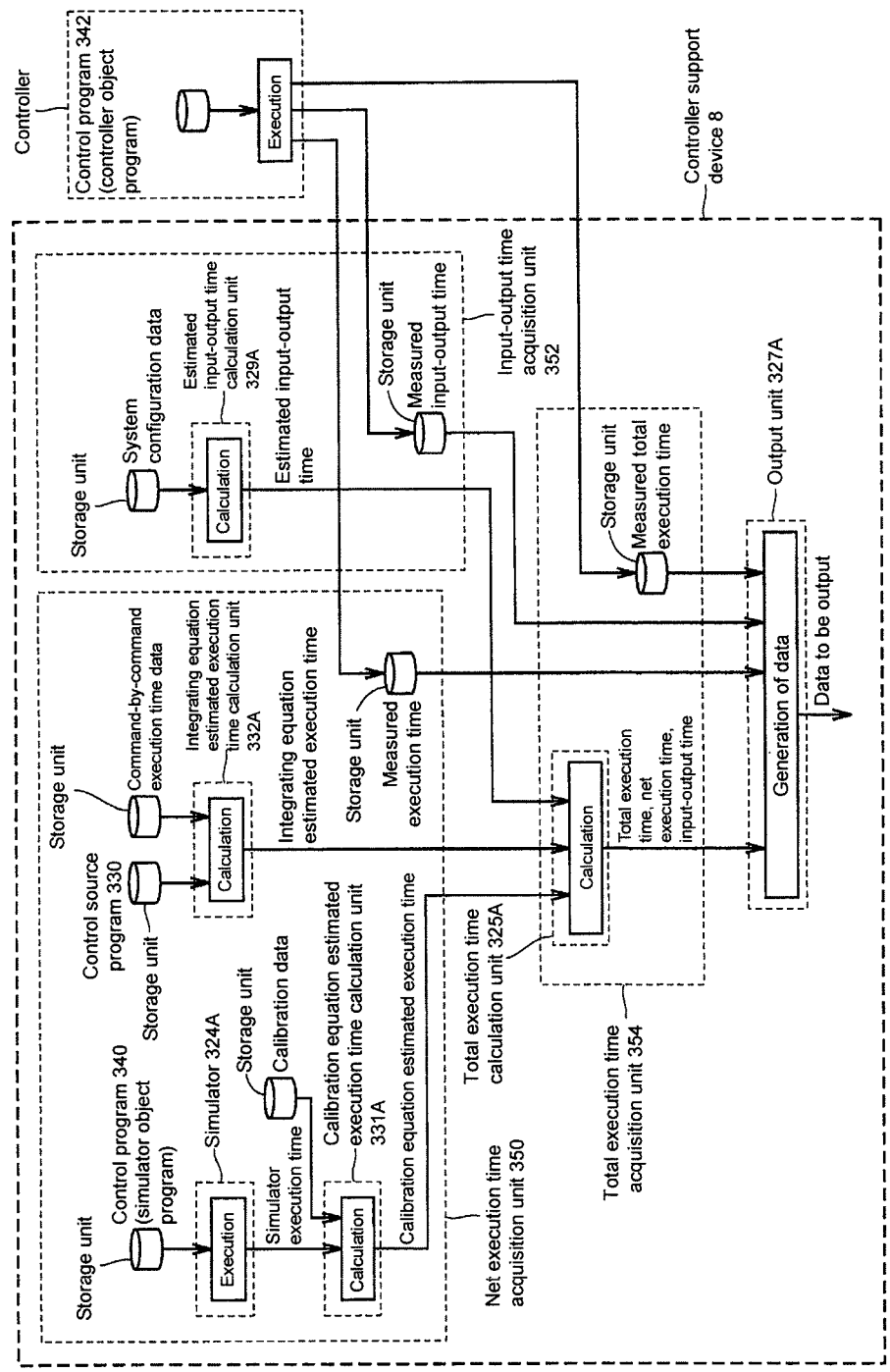
FIG. 7 is a schematic diagram illustrating entire processing related to the controller support device of the embodiment of the present invention.

The total execution time calculation program 325 constructs a total execution time calculation unit 325A in FIG. 7 by executing the total execution time calculation program 325. The output program 327 constructs an output unit 327A in FIG. 7 by executing the output program 327. The calibration equation estimated execution time calculation program 331 constructs a calibration equation estimated execution time calculation unit 331A in FIG. 7 by executing the calibration equation estimated execution time calculation program 331. The integrating equation execution time calculation program 332 constructs an integrating equation estimated execution time calculation unit 332A in FIG. 7 by executing the integrating equation execution time calculation program 332. The estimated input-output time calculation program 329 constructs an estimated input-output time calculation unit 329A in FIG. 7 by executing the estimated input-output time calculation program 329. The output program 327 constructs an output unit 327A in FIG. 7 by executing the output program 327. Pieces of processing provided by these programs are described later with reference to FIG. 7.

The controller measured time acquisition program 326 obtains a measured execution time, a measured input-output time, and a measured total execution time from the controller by executing the controller measured time acquisition program 326.

The communication program 328 provides the function of transferring the object program 342 for the CPU unit of the control program 230 to the CPU unit 13 of the PLC 1.

Generally the system program 210 mounted on the PLC 1 is stored in the nonvolatile memory 106 of the CPU unit 13 at production stage of the CPU unit 13. However, when the system program 210 is stored in the CD-ROM 9, the user can copy the system program 210 of the CD-ROM 9 into the controller support device 8, and transfer the system program 210 copied using the function provided by the communication program 328 to the CPU unit 13. When the real-time OS 200 executed by the CPU unit 13 of the PLC 1 is stored in the CD-ROM 9, the real-time OS 200 can be re-installed on the PLC 1 by the user's operation.

Thus, the storage unit (such as the ROM 82, the RAM 83, and the hard disk 84 in FIG. 5) of the controller support device 8 is used to store the control programs 340 and 342 in addition to the controller support program constructing the controller support device 8.

G. Entire Processing Related to Controller Support Device

Each piece of processing in the controller support device 8 will be described below with reference to FIG. 7. FIG. 7 is a schematic diagram illustrating entire processing related to the controller support device 8 of the embodiment of the present invention.

Referring to FIG. 7, the controller support device 8 includes a net execution time acquisition unit 350, an input-output time acquisition unit 352, a total execution time acquisition unit 354, and an output unit 327A. The controller support device 8 also includes a storage unit (such as the ROM 82, the RAM 83, and the hard disk 84 in FIG. 5).

The storage unit (such as the ROM 82, the RAM 83, and the hard disk 84 in FIG. 5) is used to store the programs in FIG. 6, and also used to store calibration data, order-by-order execution time data, system configuration data, the measured execution time, the measured input-output time, and the measured total execution time. Additionally, the storage unit is used to store the control source program 330 and the system configuration data, which are input by the user.

The controller (PLC 1) executes the control program (controller object program) 342, and measures the execution time of the control program 342 to obtain the measured execution time. The controller measures an input-output time to obtain the measured input-output time. The controller also measures a total execution time to obtain the measured total execution time. The controller support device 8 conducts communication with the controller to acquire the measured execution time, the measured input-output time, and the measured total execution time.

The net execution time acquisition unit 350 is a processing unit that acquires a net execution time. The net execution time is a time for which the controller actually executes the control program 342 in the execution cycle, namely, until the execution of the control program 342 is ended from when the execution is started, and a time that does not include a time for which the execution of the control program 342 is interrupted. The net execution time is synonymous with the actual processing time described in the background art. A calibration equation estimated execution time, an integrating equation estimated execution time, and the measured execution time correspond to the net execution time.

The net execution time acquisition unit 350 is a collective name of a series of processing units that calculate the calibration equation estimated execution time, calculate the integrating equation estimated execution time, and acquire the measured execution time. That is, the net execution time acquisition unit 350 acquires one of the times included in the net execution time. However, the controller support device 8 does not necessarily include the three types of the processing units, but the controller support device 8 can use data of the net execution time when including at least one type of the processing unit.

Thus, the controller support device 8 (CPU 81) executes the controller support program to perform the net execution time acquisition processing of acquiring the net execution time. The net execution time is the time for which the controller actually executes the control program 342 in the execution cycle, and the net execution time is the time measured in the controller or the time estimated by the controller support device 8. Each type of the net execution time acquisition unit 350 will be described below.

The calibration equation estimated execution time calculation unit 331A calculates the calibration equation estimated execution time from a simulator execution time using the calibration data. The calculation of the calibration data and the calculation of the calibration equation estimated execution time are described in detail later with reference to FIG. 8.

The control program (simulator object program) 340 is generated from the control source program 330 by the compiler program 322 (more specifically, a simulator compiler in FIG. 8) in FIG. 6. A simulator 324A executes the control program (simulator object program) 340 to measure the simulator execution time that is of the execution time of the control program 340.

Thus, the controller support device 8 (CPU 81) executes the controller support program to perform the processing of acquiring the estimated execution time, which is calculated from the control program execution time measured in the simulator of the controller (PLC 1), as the net execution time.

The integrating equation estimated execution time calculation unit 332A traces the execution of the control program based on the control source program 330, reads the execution time data of the command from the storage unit every time the command of the control program is executed, and integrates the execution time, thereby calculating the integrating equation estimated execution time.

The command-by-command execution time data is provided from a supplier of the controller support program 320.

The measured execution time, which is measured in the controller and acquired from the controller, is stored as the net execution time in the storage unit.

The series of processing units that calculate the estimated input-output time or acquires the measured input-output time are collectively called the input-output time acquisition unit 352. The controller support device 8 does not necessarily include the two types of the processing units, but the controller support device 8 can use the data of the input-output time when including at least one type of the processing unit.

Thus, the controller support device 8 (CPU 81) executes the controller support program to perform the input-output time acquisition processing of acquiring the input-output time. The input-output time is the time for which the controller performs the input-output processing (IO processing), and the input-output time is the time measured in the controller or the time estimated in the controller support device 8.

The estimated input-output time calculation unit 329A refers to the system configuration data to calculate the estimated input-output time. The execution time (input-output time) of the input-output processing correlates with the number of other units (communication nodes) connected to the CPU unit 13, an amount of control output data, and an amount of control input data, and the input-output time is lengthened with increasing number of other units, with increasing amount of control output data, and with increasing amount of control input data. The estimated input-output time calculation unit 329A calculates the estimated value (estimated input-output time) of the input-output time using the pieces of information on the number of other units, the amount of control output data, and the amount of control input data, which are included in the system configuration data stored in the storage unit.

The measured input-output time, which is measured in the controller and acquired from the controller, is stored as the input-output time in the storage unit.

The total execution time acquisition unit 354 calculates the total execution time or acquires the measured total execution time.

The total execution time is the time until the execution of the control program 342 is ended in the execution cycle from when the execution cycle of the control program 342 is started, when the controller executes the control program 342 according to the execution priority and the execution cycle. For example, for the control program A in FIG. 4, because the execution cycle of the control program A is equal to the control cycle, the total execution time of the control program A is the time until the execution of the control program A is ended in the control cycle from the beginning of the control cycle. In addition to the execution time of the control program A of itself, the execution time (input-output time) of the input-output processing (IO processing) is added to the total execution time of the control program A. On the other hand, because the execution cycle of the control program B in FIG. 4 is the four control cycles, the total execution time of the control program B is the time until the execution of the control program B is ended in the control cycle 3 from the beginning of the control cycle 1. The three input-output times and the three execution times of the control program A, which are executed until the execution of the control program B is ended from when the execution cycle of the control program B is started, is added to the total execution time of the control program B.

Thus, the total execution time acquisition processing of the embodiment includes the processing of adding the net execution time of the target control program that is of the total execution time acquiring target, the net execution time of the higher-priority control program having the execution priority higher than that of the target control program that is executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

The total execution time calculation unit 325A calculates the total execution time with respect to the control program. More specifically, the total execution time calculation unit 325A uses one of the calibration equation estimated execution time and the integrating equation estimated execution time as the net execution time in order to calculate the total execution time.

The total execution time calculation unit 325A uses the estimated input-output time as the input-output time. Alternatively, in the case of the short input-output time, the input-output time may be neglected with no use of the estimated input-output time. Alternatively, in the case of the small fluctuation in input-output time due to the difference of the system configuration, a fixed value previously possessed by the total execution time calculation unit 325A may be used as the input-output time.

Thus, the total execution time acquisition processing of the embodiment includes the processing of adding at least the net execution time of the target control program that is of the total execution time acquiring target and the net execution time of the higher-priority control program having the execution priority higher than that of the control program that is executed during the time from when the execution cycle of the target control program is started until the execution of the target control program is ended.

The total execution time calculation unit 325A may use the measured execution time as the net execution time. The total execution time calculation unit 325A may use the measured input-output time as the input-output time.

The total execution time calculation unit 325A makes the calculated total execution time available in the output unit 327A. In the case that the net execution time and the input-output time are used in the output unit 327A, the total execution time calculation unit 325A makes the net execution time and the input-output time, which are used to calculate the total execution time, available in the output unit 327A.

The measured total execution time, which is measured in the controller and acquired from the controller, is stored in the storage unit. The measured total execution time is also available in the output unit 327A.

That is, the controller support device 8 (CPU 81) executes the controller support program to perform the total execution time acquisition processing of acquiring the total execution time. The total execution time is the time measured in the controller or the time estimated in the controller support device, and the total execution time is the elapsed time until the execution of the control program is ended in the execution cycle from when the execution cycle of the control program is started when the controller (PLC 1) executes the control program according to the execution priority and the execution cycle.

The output unit 327A performs processing of generating and outputting data to be output, which indicates the total execution time (including the case of the measured total execution time). That is, the controller support device 8 (CPU 81) executes the controller support program to perform the output processing of outputting the total execution time.

The data to be output may further include data indicating the net execution time (including the case of the measured execution time) and data indicating the input-output time (including the case of the measured input-output time).

For example, the processing of generating and outputting the data to be output is processing of generating data to be displayed, which is used to display the total execution time (additionally, the net execution time and the input-output time as needed basis), and displaying on a monitor screen. The processing of generating and outputting the data to be output may be processing of generating data to be transmitted, which is used to transmit the total execution time (additionally, the net execution time and the input-output time as needed basis), and transmitting to another device. The processing of outputting the data to be output may be processing of storing the data to be output in the storage unit accessible from the outside of the controller support device.

H. Calibration Equation Estimated Execution Time Calculation Processing (h1: Outline)

Figure 8:
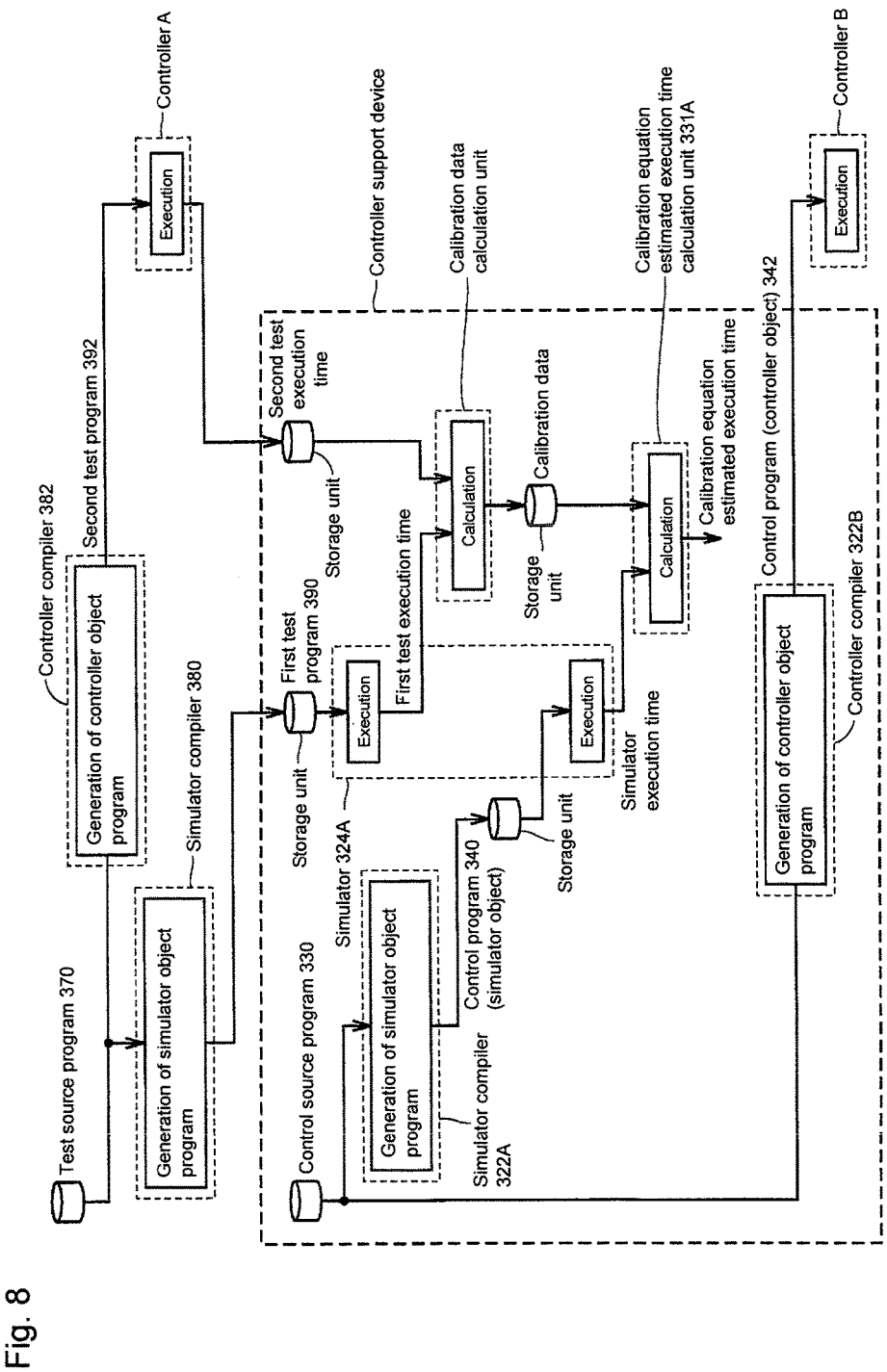
FIG. 8 is a schematic diagram illustrating a series of pieces of processing up to calibration equation estimated execution time calculation in the controller support device of the embodiment and a program and a data flow between pieces of processing.

A series of pieces of processing up to the calibration equation estimated execution time calculation, the program between pieces of processing, and the data flow will be described below with reference to FIG. 8. FIG. 8 is a schematic diagram illustrating the series of pieces of processing up to the calibration equation estimated execution time calculation in the controller support device 8 of the embodiment of the present invention, the program between pieces of processing, and the data flow.

A control program execution time estimating method in FIG. 8 mainly includes a step of the calibration data calculation processing and a step of the calibration equation estimated execution time calculation processing.

Using an execution time (first test execution time) that is previously measured with respect to a calibration test program in the simulator and an execution time (second test execution time) in controller, calibration data indicating a relationship between the execution time (first test execution time) and the execution time (second test execution time) is calculated through the calibration data calculation processing.

In the calibration equation estimated execution time calculation processing, the control program execution time (simulator execution time) measured in the simulator is acquired, and the control program execution time (simulator execution time) is converted using the calibration data, whereby an estimated value of the execution time is calculated in the case that the control program is executed by the controller.

A content of each piece of processing will be described in detail below.

(h2: Calibration Data Calculation Processing)

First, a source program (test source program) 370 of the test program is prepared.

A simulator object program (first test program) 390 is generated from the test source program 370 using a simulator compiler 380. A controller object program (second test program) 392 is generated from the test source program 370 using a controller compiler 382.

A controller A executes the second test program 392 to measure the execution time of the second test program 392, and the data of the second test execution time that is of the execution time of the second test program 392 is acquired.

Generally, these pieces of processing are performed by a supplier of the controller (such as a manufacturer, a dealer, and a technical service provider of the controller), and the first test program 390 and the second test execution time are provided to the user and stored in the storage unit of the controller support device 8. Alternatively, these pieces of processing may be performed by the user.

The simulator 324A executes the first test program 390 to measure the execution time of the first test program 390, thereby acquiring the data of the first test execution time that is of the execution time of the first test program 390. The calibration data indicating the relationship between the first test execution time and the second test execution time is calculated. That is, the calibration data calculation unit calculates the calibration data indicating the relationship between the first test execution time and the second test execution time.

Thus, the calibration data calculation processing is the processing of calculating the calibration data indicating the relationship between the first test execution time and the second test execution time.

(h3: Calibration Equation Estimated Time Calculation Processing)

Then the control source program 330 that is of the source program of the control program generated according to the control purpose of the user is prepared.

The control program (simulator object program) 340 is generated from the control source program 330 using a simulator compiler 322A.

The simulator 324A executes the control program 340 to measure the execution time of the control program 340, thereby acquiring the data of the simulator execution time.

The calibration equation estimated execution time calculation unit 331A calculates calibration equation estimated execution time by converting the simulator execution time using the calibration data. The calibration equation estimated execution time is the estimated value of the execution time of the control program (controller object program) 342 in the controller.

A controller compiler 322B generates the control program (controller object) 342 from the control source program 330. The controller object 342 may actually be generated based on the estimated execution time after the control source program 330 is corrected as needed basis. The generated controller object 342 is transferred to and executed in a controller B. The controller A is identical to the controller B from the viewpoint of the execution time.

(h4: Modification)

In the case that the simulator (controller support device 8) and the controller (PLC1) can execute the identical object code, it is not necessary to separately use the simulator compiler and the controller compiler, but a common compiler may be used. In this case, the first test program 390 and the second test program 392 are the identical program, and the simulator object program 340 and the controller object program 342 are the identical program.

The simulator compiler 380 used to compile the test source program 370 and the simulator compiler 322A used to compile the control source program 330 can generate the identical object program when compiling the identical source program. The same holds true for the controller compiler.

(h5: Another Configuration)

In the controller support device 8, as illustrated in FIG. 8, conveniently all the pieces of processing after the processing of providing the first test program 390 and the second test execution time are performed by a single device.

However, the object program may be generated by another device from the viewpoint of estimating the execution time.

Alternatively, the simulator is configured in another device, and the controller support device 8 may acquire the simulator execution time from the simulator that is the other device.

In any case, the stored first test program 390 and second test execution time may be deleted once the calibration data is calculated.

The calibration data calculation processing may be performed by another device, the controller support device 8 may acquire the calculated calibration data, and the controller support device 8 may use the calibration data while storing the calibration data.

I. Calibration Data Calculation Processing

The calibration data calculation processing indicating the relationship between the first test execution time and the second test execution time will be described below.

Figure 9:
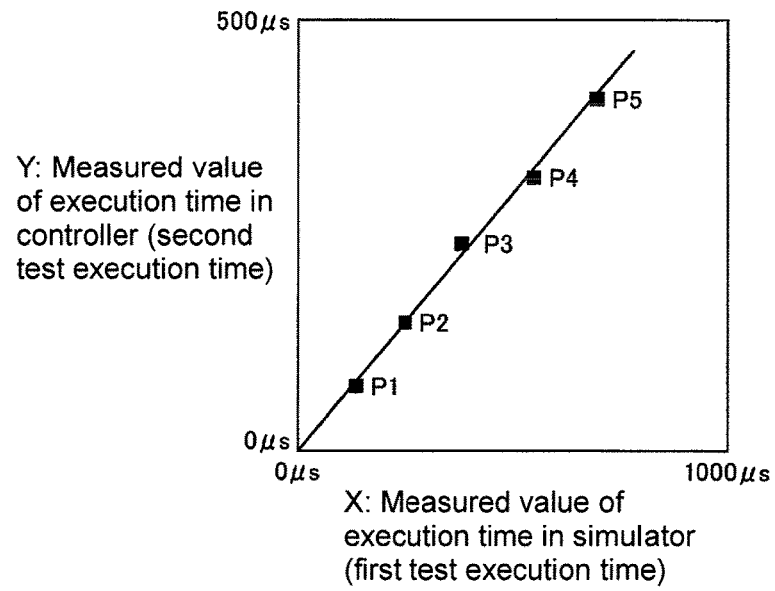
FIG. 9 is a chart illustrating an example of a relationship between a first test execution time and a second test execution time.

FIG. 9 is a chart illustrating an example of the relationship between the first test execution time and the second test execution time. In FIG. 9, an X-axis (horizontal axis) indicates the measured value (first test time) of the execution time of the first test program 390 in the simulator, and a Y-axis (vertical axis) indicates the measured value (second test execution time) of the execution time of the second test program 392 in the controller.

As described above, the first test program 390 and the second test program 392 are the object programs generated from the identical test source program 370. Measuring points P1 to P5 in the graph of FIG. 10 indicate the execution times of the first and second test programs generated from the five kinds of test source programs 370 in which the number of executed commands varies.

Each of the measuring points P1 to P5 may be the measured value of the execution time when the program is executed once. Preferably, in consideration of the fact that the execution time possibly fluctuates in every execution depending on an execution condition such as an input variable, an average value of the execution times when the program is executed a plurality of times is used.

In the case that the general-purpose computer is used as the controller support device 8, because the first test program 390 is usually executed in a non-real-time operating system environment, the execution of the first test program is possibly interrupted by the operating system. In such cases, because the measured value of the execution time is a large abnormal value, it is necessary that the abnormal value be excluded to perform the calculation in the case that the average value of the execution times is to be obtained. Similarly, because the abnormal value is also possibly generated in the control program simulator execution time serving as the basis of the calculation of the calibration equation estimated execution time, it is necessary that the abnormal value be excluded to calculate the estimated execution time.

A straight line L is obtained using a least square method such that an error among the measuring points P1 to P5 is minimized. In the example in FIG. 9, the straight line L is expressed by an equation Y=aX. The proportionality coefficient "a" serves as the calibration data. The estimated execution time can be calculated by multiplying the simulator execution time, which is of the control program execution time measured in the simulator, by the calibration data "a".

The straight line L can also be expressed by an equation Y=aX+b. In this case, values of "a" and "b" serve as the calibration data.

A substantially proportional relationship holds between the first test execution time and the second test execution time, so that the relationship between the first test execution time and the second test execution time can be expressed by the straight line. Sometimes the relationship between the first test execution time and the second test execution time is more accurately expressed by high-order functions such as a quadratic curve and a cubic curve. In such cases, each coefficient defining the high-order function serves as the calibration data.

One of the factors that the relationship between the first test execution time and the second test execution time may not be expressed by the straight line may be an influence of operation of a cache mechanism in the CPU 81 of the controller support device 8 or the microprocessor (the microprocessor 100 of the PLC 1) of the controller. It is considered that the measured value of the short execution time is not located on the straight line obtained by the measured value of the execution time that is long to some extent, due to the operation of the cache mechanism.

The calibration data can also be expressed by a table form indicating the Y values corresponding to some X values. In this case, the Y value corresponding to the X value (control program simulator execution time) that does not exist in the table is obtained using the relationship between the X and the Y values are obtained by interpolation of the straight line or the curve from the values existing near the X and the Y values in the table.

J. Display Example

A presentation example (display example) of the execution time information calculated by the above processing will be described below.

(j1: First Mode)

Figure 10:
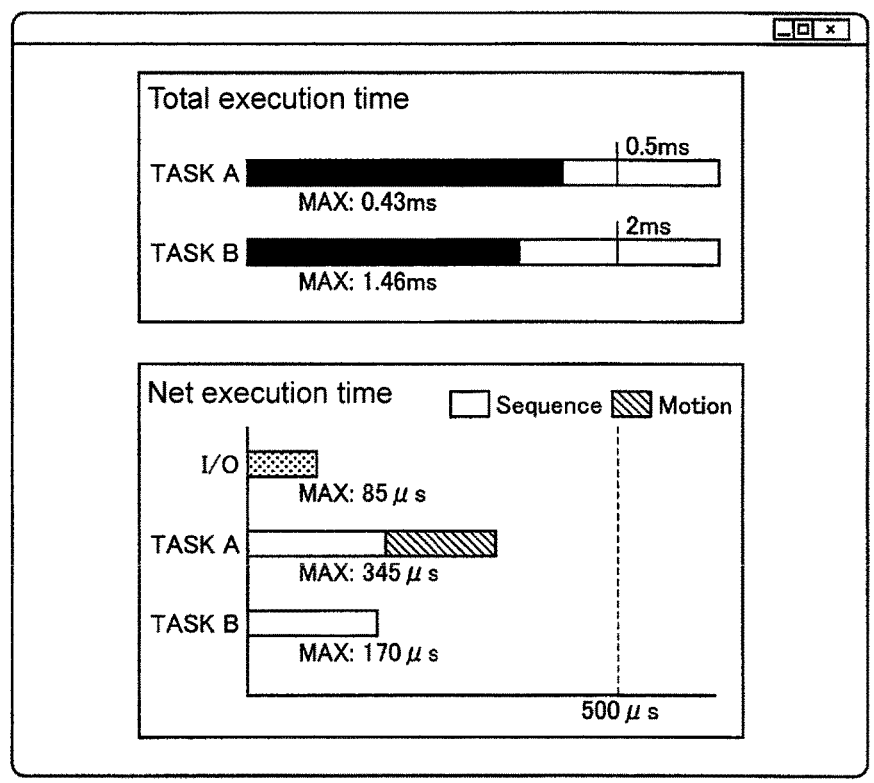
FIG. 10 is a view illustrating an example of a display screen provided in the controller support device of the embodiment of the present invention.

FIG. 10 is a view illustrating an example of a display screen provided in the controller support device 8 of the embodiment of the present invention. As illustrated in FIG. 10, the controller support device 8 displays the total execution time and the net execution time. Alternatively, only the total execution time may be displayed.

In the display screen example in FIG. 10, the control programs A and B in FIG. 4 serve as the estimation target of the execution time. On the display screen, the control program A is expressed by "TASK A", and the control program B is expressed by "TASK B".

In FIG. 10, the calibration equation estimated execution time is displayed as the net execution time. The integrating equation estimated execution time and/or the measured execution time may be displayed instead of the calibration equation estimated execution time.

As described above, the net execution time is the time for which the control program is actually executed except an execution pausing time. For example, in FIG. 4, the control program B is executed with the two execution pausing times while divided into three times. The net execution time is a sum of the times, which are actually executed while divided into three times.

The input-output time is also displayed in a display portion of the net execution time. The input-output processing is expressed by "I/O".

"500 µs" in the in display portion of the net execution time indicates that the control cycle has the duration of 500 µs.

In the simulator, the simulator execution time that serves as the basis of the calculation of the calibration equation estimated execution time (net execution time) can be measured by separately executing the control programs A and B without the execution pausing time. Similarly to the execution in the controller, in the simulator, the control programs A and B may be executed according to the execution priority and the execution cycle like the sequence in FIG. 4, and the actually-executed time may be measured.

Preferably the measurement of the simulator execution time and the calculation of the estimated execution time are repeatedly performed a plurality of times. When the control program is repeatedly executed, the execution condition such as the variable used in the control program changes, and therefore the execution time fluctuates. A MAX value, which is displayed while added to the graph of the net execution time, is a maximum value when the control program is repeatedly executed. A minimum value and an average value may be displayed in addition to the maximum value.

The estimated execution time of the control program A is calculated while divided into a sequence arithmetic portion and a motion arithmetic part, and the estimated execution time is displayed in the graph while divided into the sequence arithmetic portion and the motion arithmetic part.

In the display portion of the total execution time, each of "0.5 ms" and "2 ms" indicates the duration of the execution cycle of the control program.

Thus, the total execution time is preferably displayed in the mode of the graph in which the total execution time is contrasted with the duration of the execution cycle of the control program that is of the total execution time acquiring target. The maximum value of the total execution time of each control program is displayed similarly to the case for the net execution time. The display of the total execution time allows the user to check whether the execution of each control program can be ended within the execution cycle. That is, it is also said that the output processing is the processing of outputting the display data for displaying the total execution time in the graph mode in which the total execution time can be contrasted with the duration of the execution cycle of the control program that is of the total execution time acquiring target.

(j2: Second Mode)

Figure 11:
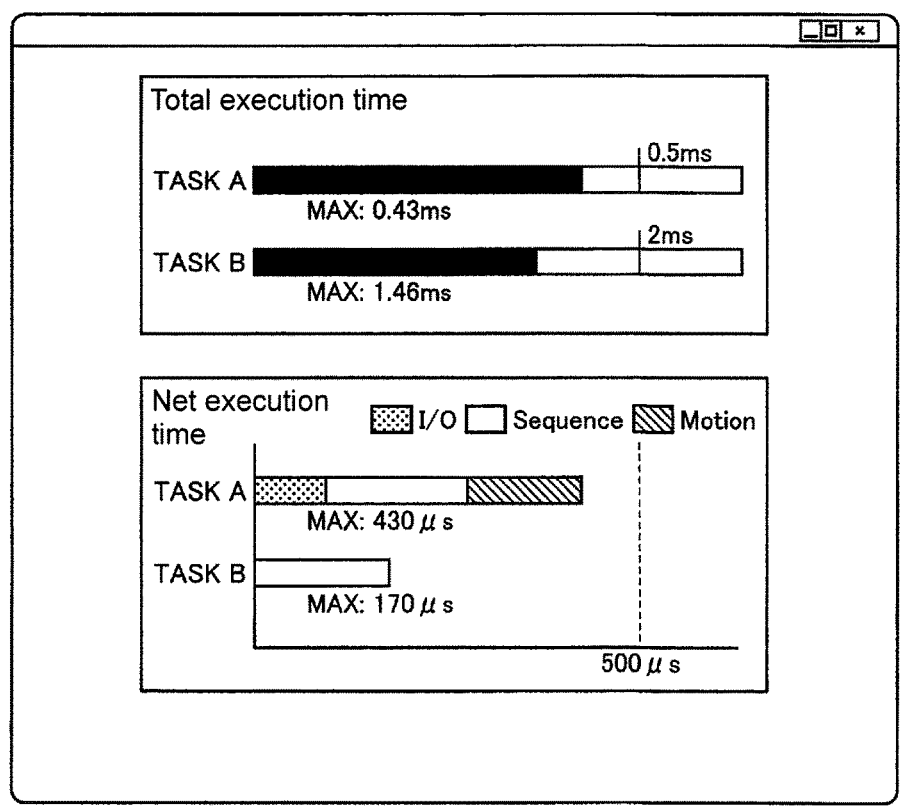
FIG. 11 is a view illustrating another example of an estimated execution time display screen output from the controller support device of the embodiment of the present invention.

FIG. 11 is a view illustrating another example of the estimated execution time display screen output from the controller support device 8 of the embodiment of the present invention.

In the display screen example in FIG. 11, the display mode of the total execution time is identical to that in FIG. 10. The display screen example in FIG. 11 differs from the display screen example in FIG. 10 in that the execution time of the input-output processing (IO processing) is displayed in the display portion of the net execution time while included in "TASK A".

On the display screen in FIG. 11, the execution time of the IO processing performed in the same duration as the duration of the execution cycle of the control program (in this case, the control program A) and the execution time of the control program are displayed while added to each other. Thus, the display of the net execution time includes the case that the execution time of another piece of processing performed in combination with the execution of the control program is added to the net execution time. In other words, the net execution time of the control program is not necessarily displayed, but the substantive net execution time including the net execution time of the control program may be displayed so as to be helpful to the user in determining the control cycle duration, the execution cycle duration, and the way to divide the control program.

The graph of the task A of the net execution time is displayed such that the execution time of the IO processing and the execution time of the control program A are distinguished from each other. The MAX value, which is displayed while added to the graph, is the execution time including the IO processing time, but the net execution time of the control program is not indicated by the numerical value. Thus, the net execution time of the control program may be displayed only by the graph.

In the sequence diagram in FIG. 4, the input-output processing (IO processing) is performed in both the control programs A and B. Alternatively, the input-output processing in FIG. 4 may be performed only in the control program A, and another piece of input-output processing may be performed once in the execution cycle of the control program B, for example, before the execution of the control program B is started. In this case, on the display screen in FIG. 11, the input-output processing execution time for the control program B is included in the net execution time of the task B.

(j3: Third Mode)

Figure 12:
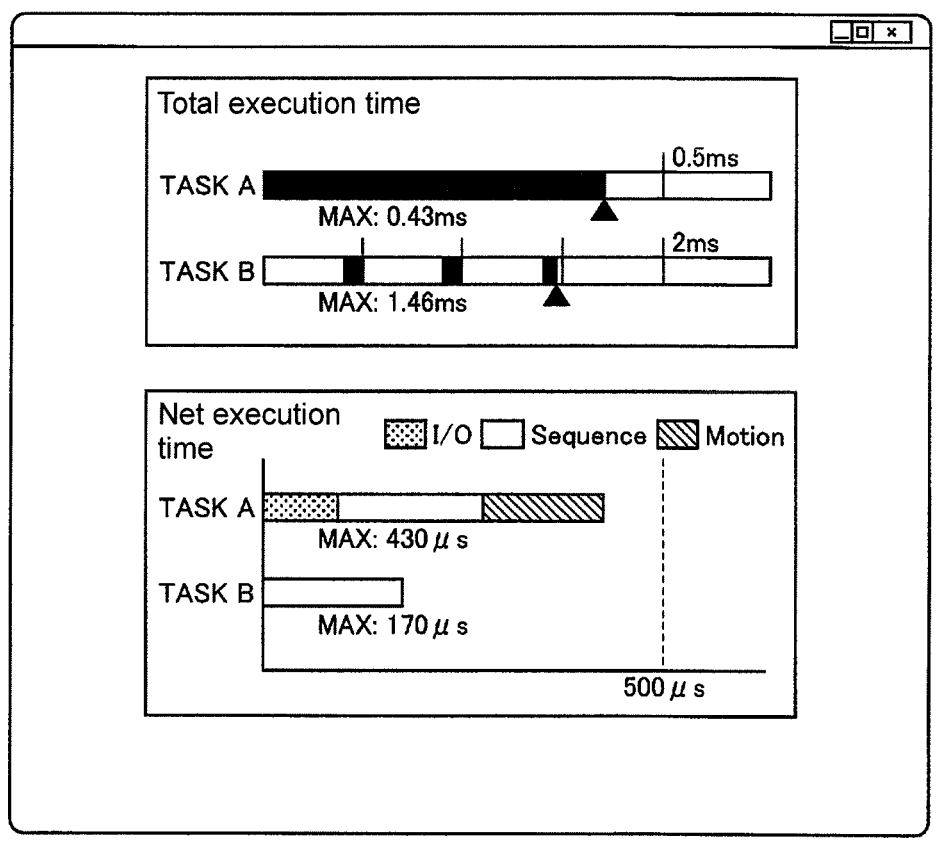
FIG. 12 is a view illustrating still another example of the estimated execution time display screen output from the controller support device of the embodiment of the present invention.

FIG. 12 is a view illustrating still another example of the estimated execution time display screen output from the controller support device 8 of the embodiment of the present invention.

In the display screen example in FIG. 12, the display mode of the net execution time is identical to that in FIG. 11. The display screen example in FIG. 12 differs from the display screen example in FIG. 11 in that, in the display portion of the total execution time, a range of the control cycle is indicated on the graph with respect to the control program (control program B) having execution cycle extending across the plurality of control cycles.

That is, on the display screen in FIG. 12, three vertical lines that divide the execution cycle of 2 ms into four are marks indicating each range of the control cycle. Additionally, on the display screen in FIG. 12, only the portion of the time in which the control program is actually executed in the total execution time is displayed in color. In the display screen example in FIG. 12, the use of the display mode allows the user to recognize at a glance that, for the control program B, the starting and the interruption of the execution are performed in the first control cycle of the execution cycle, the resumption and the interruption of the execution are performed in the second control cycle, the execution is ended within the control cycle after the execution is resumed in the third control cycle, and the control program is not executed in the fourth control cycle.

On the display screen in FIG. 12, a time point when the execution of the control program is ended is indicated by a mark. In the example in FIG. 12, a triangle is used as the mark. Therefore, the position of the time point when the execution of the control program is ended is easily recognized even if the control program is intermittently executed with the interruption interval in the execution cycle.

Thus, it is also said that the output processing is the processing of outputting the display data for displaying the total execution time and the net execution time included in the total execution time.

K. Server Client Configuration

As described above, the processing of estimating the control program execution time is performed in the stand-alone mode by way of example. Alternatively, the processing of estimating the control program execution time may be performed in what is called a server client mode.

Figure 13:
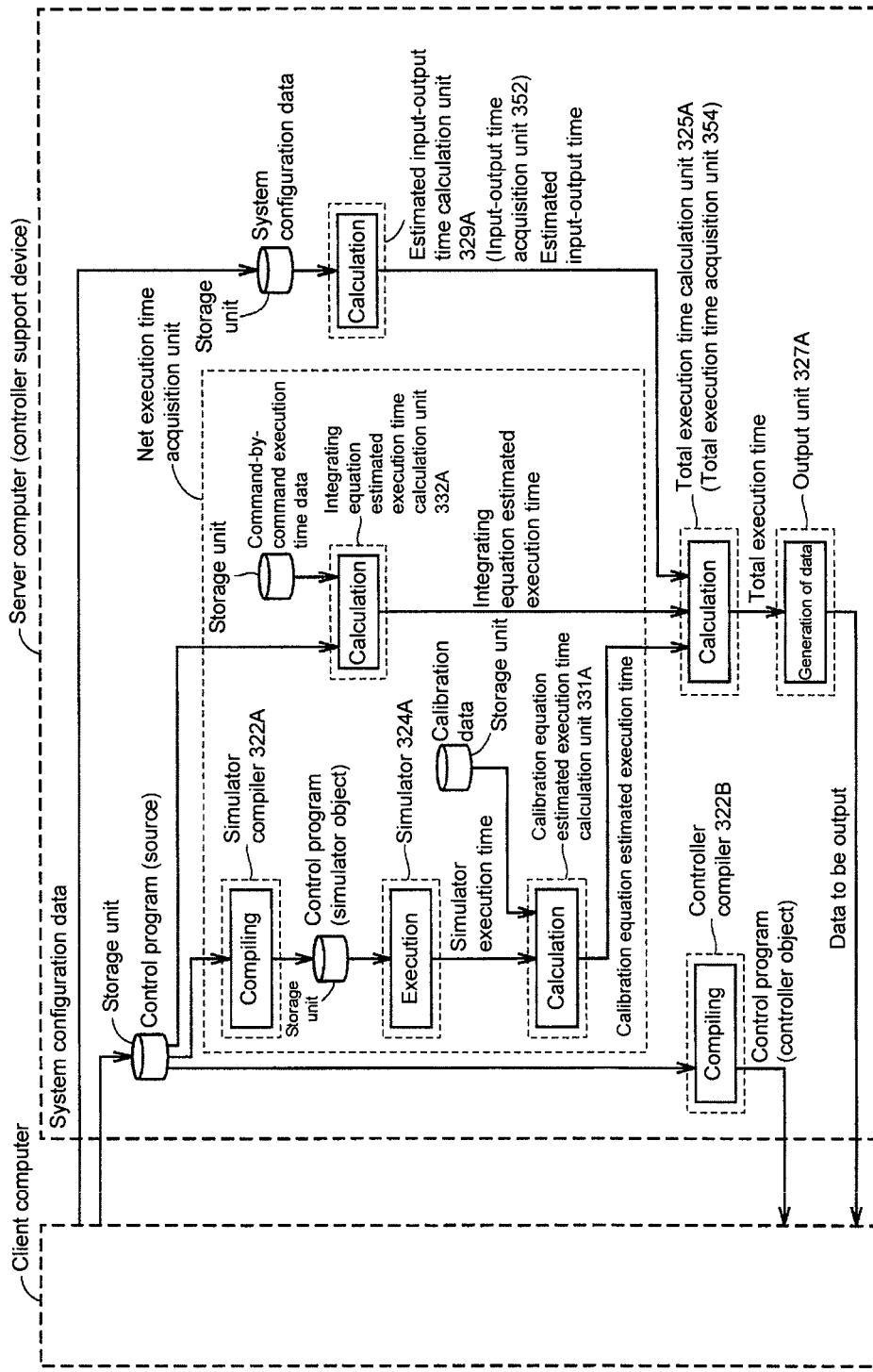
FIG. 13 is a schematic diagram illustrating entire processing related to a controller support device implemented by a server computer of the embodiment of the present invention.

FIG. 13 is a schematic diagram illustrating entire processing related to a controller support device implemented by a server computer of the embodiment of the present invention. FIG. 13 is the schematic diagram illustrating a series of pieces of processing up to the calculation of the calibration equation estimated execution time, the program between the pieces of processing, and a flow of the data in the case that the controller support device is constructed by the server computer.

Referring to FIG. 13, the server computer that acts as the controller support device includes the program group that acts as the simulator compiler 322A, the controller compiler 322B, the simulator 324A, the calibration equation estimated execution time calculation unit 331A, the integrating equation estimated execution time calculation unit 332A, the estimated input-output time calculation unit 329A, the total execution time calculation unit 325A and the output unit 327A. The control source program, the calibration data, command-by-command execution time data, and the system configuration data are stored in the storage unit of the server computer. The control source program and the system configuration data are transmitted from a client computer.

For example, the server computer may be installed in a business facility of the user and connected to the client computer through a LAN, or the server computer may be installed in a business facility of the controller supplier and connected to the client computer in the business facility of the user through the Internet.

The calibration data stored in the storage unit in FIG. 13 is calculated through the processing similar to that in FIG. 8. The processing of calculating the calibration data may be performed using another computer, or the whole or part of the processing of calculating the calibration data may be performed in the server computer. However, in the case that the simulator executing the first test program 390 is provided in another computer, it is necessary that the simulator be able to execute the identical program in the identical execution time compared with the simulator of the server computer.

Even if the series of pieces of processing up to the calculation of the calibration data is performed in the server computer, the use of the calibration data is sufficient for a stage at which the server computer provides service to the client computer. Therefore, the program and data used to obtain the calibration data may be deleted from the server computer.

The control source program 330 is generated in the client computer, and transmitted to the server computer.

In response to the instruction from the client computer, the server computer generates the control program (controller object program) 342 from the control source program 330 using the controller compiler 322B, and transmits the control program 342 to the client computer. The server computer may not include the controller compiler 322B, and the server computer may not perform the generation service of the control program 342.

In FIG. 13, the pieces of processing from the processing of generating the control program (simulator object program) 340 to the processing of calculating the calibration equation estimated execution time are similar to those in FIG. 8. The processing of calculating the integrating equation estimated execution time and the processing of calculating the estimated input-output time are similar to those in FIG. 7. Only one of the processing system that calculates the calibration equation estimated execution time and the processing system that calculates the integrating equation estimated execution time may be included.

The processing of calculating the total execution time is similar to that in FIG. 7. However, the processing of calculating the total execution time differs from that in FIG. 7 in that the measured execution time, the measured input-output time, and the measured total execution time, which are measured in the controller, are not used.

For example, the output unit 327A generates the data to be output (data to be displayed) for displaying the net execution time and the total execution time in the mode in FIG. 10, FIG. 11, or FIG. 12, and transmits to the client computer the data to be output. For example, the data to be output is data having an HTML format in which the data can be displayed using a web browser. The output unit 327A may transmit only the pieces of numerical data indicating the net execution time, the input-output time, and the total execution time to the client computer, and the client computer may determine the display mode of the pieces of numerical data.

The server computer may receive the control program (simulator object) 340 generated in the client computer so as not to include the simulator compiler 322A.

The disclosed embodiment is illustrative only, but not restrictive. The scope of the present invention is expressed by not the above description but the claims, and the meaning equivalent to the claims and all the changes within the claims are included in the present invention.

DESCRIPTION OF SYMBOLS

1 PLC
2 field network
3 servo motor driver
4 servo motor
5 remote IO terminal
6 detection switch
7 relay
8 controller support device
9 CD-ROM
10 connection cable
11 PLC system bus
12 power supply unit
13 CPU unit
14, 53 IO unit
15 special unit
51 terminal bus
52 communication coupler
81 CPU
82 ROM
83 RAM
84 hard disk
85 keyboard
86 mouse
87 monitor
88 CD-ROM drive
100 microprocessor
102 chipset
104 main memory
106 nonvolatile memory
108 system timer
110 USB connector
120 PLC system bus controller
122 DMA control circuit
124 PLC system bus control circuit
126, 146 buffer memory
130 connector
140 field network controller
142 DMA control circuit
144 field network control circuit
210 system program
212 scheduler program
214 output processing program
216 input processing program
218 IO processing program
220 other system program 230 control program
232 sequence command arithmetic program
234 motion arithmetic program
236 user program
320 controller support program
321 editor program
322 compiler program
322A, 380 simulator compiler
322B, 382 controller compiler
323 debugger program
324 simulator program
324A simulator
325 total execution time calculation program
325A total execution time calculation unit
326 controller measured time acquisition program
327 output program
327A output unit
328 communication program
329 estimated input-output time calculation program
329A estimated input-output time calculation unit
330 control source program
331 calibration equation estimated execution time calculation program
331A calibration equation estimated execution time calculation unit
332 integrating equation execution time calculation program
332A integrating equation estimated execution time calculation unit
340 control program
340 simulator object program
342 controller object program
350 net execution time acquisition unit
352 input-output time acquisition unit
354 total execution time acquisition unit
370 test source program
390 first test program
392 second test program
200 real-time OS
SYS system

The invention claimed is:

1. A controller support device configured to support use of a controller controlling a control target, the controller support device comprising:
  a controller;
  a storage; and
  an arithmetic unit,
  wherein the controller can execute a plurality of control programs in each control cycle according to an execution priority set on each of the control programs and an execution cycle that is an integral multiple of the control cycle,
  wherein the controller assigns a different priority to each of the plurality of control programs and executes the plurality of control programs in accordance with the assigned different priorities, such that execution of a lower priority control program is interrupted as necessary by an execution of a higher priority control program,
  wherein the higher priority control program includes a motion command to perform motion control and a motion arithmetic program that is executed by performing the motion command, and the lower priority control program does not include a motion command;
  wherein the storage is used to store a controller support program and the plurality of control programs therein, and
  wherein the controller support program causes the arithmetic unit to execute total execution time acquisition processing of acquiring a total execution time and output processing of outputting the total execution time, the total execution time being an elapsed time until execution of the control program is ended in the execution cycle from when the corresponding execution cycle is started when the controller executes the plurality of control programs according to the respective execution priorities and the respective execution cycles, the total execution time being a time measured in the controller or a time estimated in the controller support device.

2. The controller support device according to claim 1,
  wherein the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device, and
  the total execution time acquisition processing including processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

3. The controller support device according to claim 2,
  wherein the net execution time acquisition processing is processing of acquiring an estimated execution time as the net execution time, the estimated execution time being calculated from an execution time of the control program, the execution time of the control program being measured in a simulator of the controller.

4. The controller support device according to claim 2,
  wherein the controller executes input-output processing in each of the control cycle or the execution cycle of the control program,
  the controller support program causes the arithmetic unit to execute input-output time acquisition processing of acquiring an input-output time, the input-output time being a time necessary for the controller to execute the input-output processing, the input-output time being the time measured in the controller or the time estimated in the controller support device, and
  the total execution time acquisition processing comprises processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

5. The controller support device according to claim 4, wherein the net execution time acquisition processing is processing of acquiring an estimated execution time as the net execution time, the estimated execution time being calculated from an execution time of the control program, the execution time of the control program being measured in a simulator of the controller.

6. The controller support device according to claim 1, wherein the output processing is processing of outputting display data that is used to display the total execution time in a form of a graph, in which the total execution time can be contrasted with a duration of the execution cycle of the target control program that is of the target from which the total execution time is acquired.

7. The controller support device according to claim 2, wherein the output processing is processing of outputting display data used to display the total execution time and the net execution time included in the total execution time.

8. A method for executing a controller support program in a controller support device, including a storage and an arithmetic unit, that is configured to support use of a controller controlling a control target, the method comprising:

executing, by the controller, a plurality of control programs in each control cycle according to an execution priority set on each of the control programs and an execution cycle that is an integral multiple of the control cycle, wherein the controller assigns a different priority to each of the plurality of control programs and executes the plurality of control programs in accordance with the assigned different priorities, such that execution of a lower priority control program is interrupted as necessary by an execution of a higher priority control program, and wherein the higher priority control program includes a motion command to perform motion control and a motion arithmetic program that is executed by performing the motion command, and the lower priority control program does not include a motion command;

storing, in the storage, the controller support program and the plurality of control programs; and causing, by execution of the controller support program, the arithmetic unit to execute total execution time acquisition processing of acquiring a total execution time and output processing of outputting the total execution time, the total execution time being an elapsed time until execution of the control program is ended in the execution cycle from when the corresponding execution cycle is started when the controller executes the plurality of control programs according to the respective execution priorities and the respective execution cycles, the total execution time being a time measured in the controller or a time estimated in the controller support device.

9. The method according to claim 8, wherein the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device, and the total execution time acquisition processing comprises processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

10. The method according to claim 9, wherein the net execution time acquisition processing is processing of acquiring an estimated execution time as the net execution time, the estimated execution time being calculated from an execution time of the control program, the execution time of the control program being measured in a simulator of the controller.

11. The method according to claim 9, wherein the controller executes input-output processing in each of the control cycle or the execution cycle of the control program, the controller support program causes the arithmetic unit to execute input-output time acquisition processing of acquiring an input-output time, the input-output time being a time necessary for the controller to execute the input-output processing, the input-output time being the time measured in the controller or the time estimated in the controller support device, and the total execution time acquisition processing comprises processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

12. The method according to claim 11, wherein the net execution time acquisition processing is processing of acquiring an estimated execution time as the net execution time, the estimated execution time being calculated from an execution time of the control program, the execution time of the control program being measured in a simulator of the controller.

13. The method according to claim 8, wherein the output processing is processing of outputting display data that is used to display the total execution time in a form of a graph, in which the total execution time can be contrasted with a duration of the execution cycle of the target control program that is of the target from which the total execution time is acquired.

14. The method according to claim 9, wherein the output processing is processing of outputting display data used to display the total execution time and the net execution time included in the total execution time.

15. A non-transitory recording medium in which a controller support program is stored, the controller support program being executed in a controller support device, configured to support use of a controller controlling a control target, to perform operations, comprising:

executing, by the controller, a plurality of control programs in each control cycle according to an execution priority set on each of the control programs and an execution cycle that is an integral multiple of the control cycle, wherein the controller support device includes a storage and an arithmetic unit, wherein the controller assigns a different priority to each of the plurality of control programs and executes the plurality of control programs in accordance with the assigned different priorities, such that execution of a lower priority control program is interrupted as necessary by an execution of a higher priority control program, and wherein the higher priority control program includes a motion command to perform motion control and a motion arithmetic program that is executed by performing the motion command, and the lower priority control program does not include a motion command;

storing, in the storage, the controller support program and the plurality of control programs; and causing, by execution of the controller support program, the arithmetic unit to execute total execution time acquisition processing of acquiring a total execution time and output processing of outputting the total execution time, the total execution time being an elapsed time until execution of the control program is ended in the execution cycle from when the corresponding execution cycle is started when the controller executes the plurality of control programs according to the respective execution priorities and the respective execution cycles, the total execution time being a time measured in the controller or a time estimated in the controller support device.

16. The non-transitory recording medium in which a controller support program is stored according to claim 15, wherein the controller support program further causes the arithmetic unit to execute net execution time acquisition processing of acquiring a net execution time, the net execution time being a time for which the controller actually executes the control program in the execution cycle, the net execution time being the time measured in the controller or the time estimated in the controller support device, and the total execution time acquisition processing comprises processing of adding the net execution time of a target control program that is of a target from which the total execution time is to be acquired and the net execution time of a higher-priority control program having an execution priority higher than that of the target control program, the higher-priority control program being executed during a time from when the execution cycle of the target control program is started until the execution of the target control program in the execution cycle is ended.

17. The non-transitory recording medium in which a controller support program is stored according to claim 16, wherein the net execution time acquisition processing is processing of acquiring an estimated execution time as the net execution time, the estimated execution time being calculated from an execution time of the control program, the execution time of the control program being measured in a simulator of the controller.

18. The non-transitory recording medium in which a controller support program is stored according to claim 16, wherein the controller executes input-output processing in each of the control cycle or the execution cycle of the control program, the controller support program causes the arithmetic unit to execute input-output time acquisition processing of acquiring an input-output time, the input-output time being a time necessary for the controller to execute the input-output processing, the input-output time being the time measured in the controller or the time estimated in the controller support device, and the total execution time acquisition processing comprises processing of adding the net execution time of the target control program that is of the target from which the total execution time is to be acquired, the net execution time of the higher-priority control program having the execution priority higher than that of the target control program, the higher-priority control program being executed during the time from when the execution cycle of the target control program is started until the execution of the target control program in the execution cycle is ended, and the input-output time of the input-output processing that is executed during the time from when the execution cycle of the target control program is started until the execution of the target control program in the execution cycle is ended.

19. The non-transitory recording medium in which a controller support program is stored according to claim 18, wherein the net execution time acquisition processing is processing of acquiring an estimated execution time as the net execution time, the estimated execution time being calculated from an execution time of the control program, the execution time of the control program being measured in a simulator of the controller.

20. The non-transitory recording medium in which a controller support program is stored according to claim 15, wherein the output processing is processing of outputting display data that is used to display the total execution time in a form of a graph, in which the total execution time can be contrasted with a duration of the execution cycle of the target control program that is of the target from which the total execution time is acquired.

21. The non-transitory recording medium in which a controller support program is stored according to claim 16, wherein the output processing is processing of outputting display data used to display the total execution time and the net execution time included in the total execution time.

* * * * *